United States Patent
Aleem et al.

(10) Patent No.: US 11,704,931 B2
(45) Date of Patent: Jul. 18, 2023

(54) PREDICTING DISPLAY FIT AND OPHTHALMIC FIT MEASUREMENTS USING A SIMULATOR

(71) Applicant: Google LLC, Mountain View, CA (US)

(72) Inventors: Idris Syed Aleem, Kitchener (CA); Daniel David Albin Balzerson, Kitchener (CA)

(73) Assignee: Google LLC, Mountain View, CA (US)

( * ) Notice: Subject to any disclaimer, the term of this patent is extended or adjusted under 35 U.S.C. 154(b) by 146 days.

(21) Appl. No.: 17/302,286

(22) Filed: Apr. 29, 2021

(65) Prior Publication Data
US 2022/0350985 A1 Nov. 3, 2022

(51) Int. Cl.
*G06V 40/16* (2022.01)
*G02B 27/01* (2006.01)
*G06F 3/01* (2006.01)

(52) U.S. Cl.
CPC ....... *G06V 40/165* (2022.01); *G02B 27/0172* (2013.01); *G06F 3/013* (2013.01); *G02B 2027/0138* (2013.01); *G06V 2201/12* (2022.01)

(58) Field of Classification Search
CPC .................. A41H 1/02; G02B 27/0172; G02B 2027/0138; G02C 13/003; G06F 3/011; G06F 3/013; G06F 3/016; G06T 17/00; G06T 7/73; G06T 2207/10016; G06T 2207/10024; G06T 2207/30201; G06V 40/165; G06V 2201/12
See application file for complete search history.

(56) References Cited

U.S. PATENT DOCUMENTS

| | | | |
|---|---|---|---|
| 7,914,148 B2* | 3/2011 | Fisher | G06F 30/20 351/200 |
| 11,215,850 B2* | 1/2022 | Schwarz | G06T 19/20 |
| 2013/0125406 A1 | 5/2013 | Delort | |
| 2016/0062152 A1 | 3/2016 | Fonte et al. | |
| 2019/0146243 A1 | 5/2019 | Parandian et al. | |
| 2020/0285081 A1* | 9/2020 | Fonte | G02C 13/003 |

* cited by examiner

*Primary Examiner* — Nelson M Rosario
(74) *Attorney, Agent, or Firm* — Brake Hughes Bellermann LLP

(57) ABSTRACT

A system and method of detecting display fit measurements and/or ophthalmic measurements for a head mounted wearable computing device including a display device is provided. The system and method may include capturing image data including a face of a user to be fitted for the head mounted wearable computing device. A three-dimensional head pose and gaze measurements may be extracted and a three-dimensional model may be developed from the captured image data. The system may detect display fit measurements and/or ophthalmic fit measurements from the three-dimensional model, and may provide one or more head mounted wearable computing devices that meet the display fit and/or ophthalmic fit requirements.

23 Claims, 16 Drawing Sheets

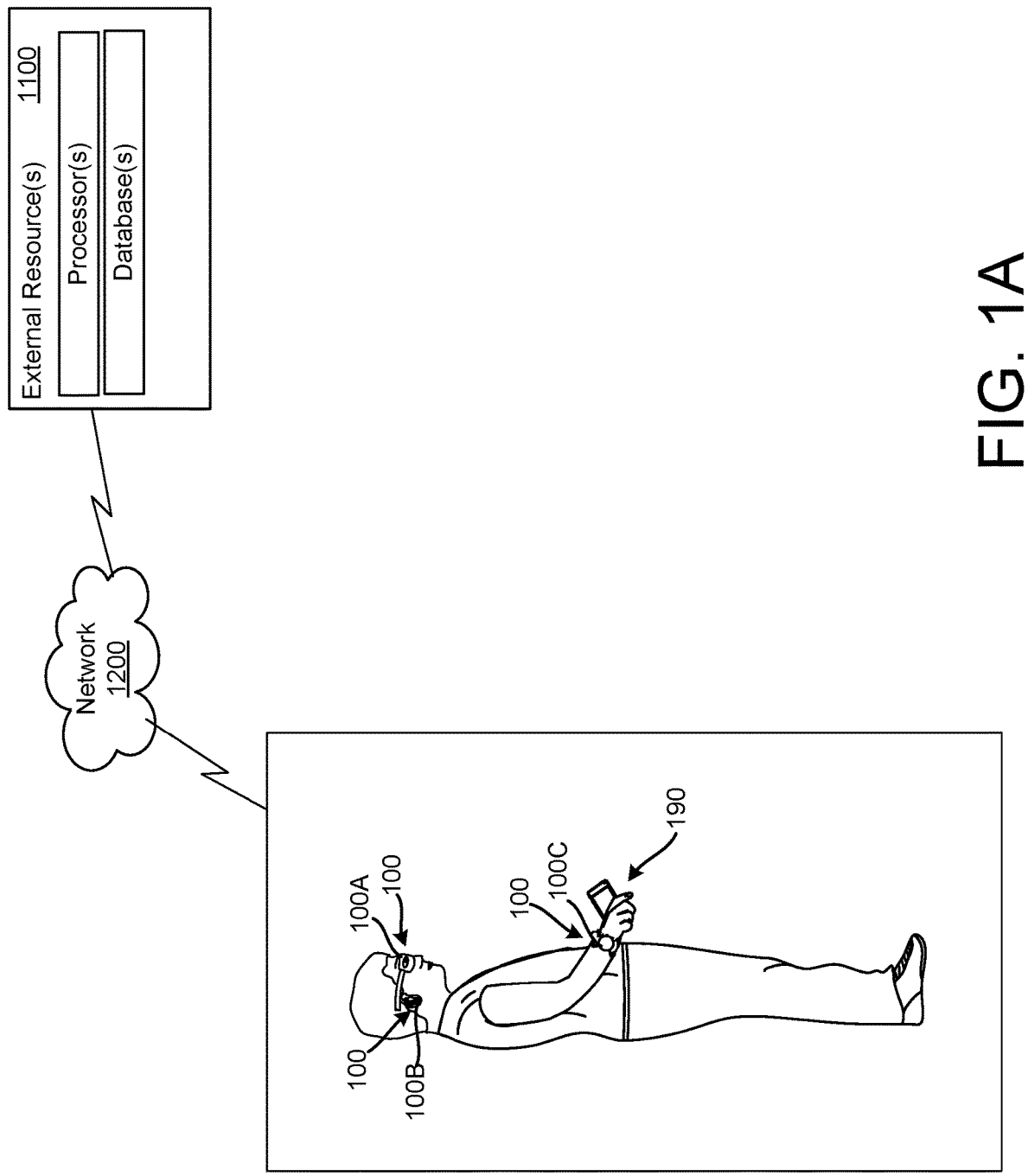

PREDICTING DISPLAY FIT AND OPHTHALMIC FIT MEASUREMENTS USING A SIMULATOR

TECHNICAL FIELD

This description relates in general to the prediction of display fit and ophthalmic fit of a wearable device, and in particular to the prediction of display fit and ophthalmic fit of a head worn computing device including display capability.

BACKGROUND

Wearable devices may include head worn devices including, for example, smart glasses, headsets, ear buds and the like, wrist and/or hand worn devices such as smart watches, smart bracelets, smart rings and the like, smart pendants, fitness trackers, cameras, body sensors, and other such devices. In some examples, a user may want to customize a wearable device for fit and/or function. For example, a user may wish to customize a pair of smart glasses to include selection of frames, incorporation of prescription lenses, and other such features. Existing systems for procurement of these types of wearable devices do not provide for this type of customization and fitting, particularly without access to a retail establishment.

SUMMARY

In a first general aspect, a computer-implemented method of detecting display fit measurements for a head mounted wearable computing device including a display device may include capturing image data, via an application executing on a computing device operated by a user, the image data including images of a head of the user; developing, via the application, a three-dimensional model of the head of the user based on the image data; transmitting, by the computing device, the three-dimensional model of the head of the user to a simulation engine; receiving, from the simulation engine, a three-dimensional pose of the head mounted wearable device on the head of the user in response to the transmitting of the three-dimensional model of the head of the user; and determining a configuration of the head mounted wearable device for the user based on the three-dimensional model of the head of the user and the three-dimensional pose of the wearable computing device on the head of the user.

In some implementations, developing the three-dimensional model of the head of the user includes developing the three-dimensional model of the head of the user by a processor of the computing device. In some implementations, developing the three-dimensional model of the head of the user includes transmitting, by the computing device, the image data to an external computing device; and receiving, by the computing device, the three-dimensional model of the head of the user from the external computing device.

In some implementations, capturing the image data includes triggering output of a first prompt to the user for user capture of a first set of image data; capturing the first set of image data in response to the first prompt; and developing the three-dimensional model of the head of the user. Triggering output of the first prompt may include outputting guidance to the user related to user adjustment of at least one of a position of the computing device, an orientation of the computing device, or a head posture. Triggering output of the first prompt may include outputting a progress indicator indicating progress and completion in the user capture of the first set of image data.

In some implementations, capturing the image data includes triggering output of a second prompt to the user for user capture of a second set of image data; capturing the second set of image data in response to the second prompt; and detecting a plurality of optical measurements in the second set of image data. Triggering output of the second prompt may include outputting guidance directing an eye gaze of the user relative to the computing device. Outputting the guidance directing the eye gaze of the user relative to the computing device may include at least one of directing the user to gaze at a camera of the computing device; or triggering display of a focus object on a display device of the computing device and directing the user to gaze at the focus object. Triggering output of the second prompt may include outputting a progress indicator indicating progress and completion in capturing the second set of image data.

In some implementations, triggering output of the first prompt may include outputting at least one of a visual prompt or an audible prompt, and triggering output of the second prompt includes outputting at least one of a visual prompt or an audible prompt.

In some implementations, the plurality of optical measurements include at least one of pupil height, interpupillary distance, left pupil distance, right pupil distance, vertex distance or pantoscopic angle.

In some implementations, the method also includes determining an ophthalmic fit for the head mounted wearable computing device based on the plurality of optical measurements for incorporation of corrective lenses into the head mounted wearable computing device; and adapting the configuration of the head mounted wearable computing device to accommodate the ophthalmic fit.

In some implementations, the application executing on the computing device invokes a self-portrait mode of operation and initiates operation of a forward facing camera of the computing device operated by the user.

In another general aspect, a non-transitory computer-readable medium may store executable instructions that, when executed by at least one processor, are configured to cause the at least one processor to capture image data, via an application executing on a computing device operated by a user, the image data including images of a head of the user; develop, via the application executing on the computing device, a three-dimensional model of the head of the user based on the image data; transmit, by the computing device, the three-dimensional model of the head of the user to a simulation engine; receive, from the simulation engine, a three-dimensional pose of a head mounted wearable computing device including a display device as the head mounted wearable computing device would be worn by the user in response to the transmission of the three-dimensional model of the head of the user to the simulation engine; and determine a configuration of the head mounted wearable computing device including the display device based on the three-dimensional model of the head of the user and the three-dimensional pose of the head mounted wearable computing device on the head of the user.

In some implementations, the instructions cause the at least one processor to trigger output of a first prompt to the user for user capture of a first set of image data; process the first set of image data for development of the three-dimensional model of the head of the user; trigger output of a second prompt to the user for user capture of a second set of image data; and process the second set of image data for detection of a plurality of optical measurements related to the three-dimensional pose of the wearable computing device as the wearable computing device would be worn on the head of the user. In some implementations, the instructions cause the at least one processor to trigger the output of the first prompt including at least one of a visual prompt or an audible prompt; and trigger the output of the second prompt including at least one of a visual prompt or an audible prompt.

In some implementations, the instructions cause the at least one processor to trigger the output of the first prompt including guidance to the user related to user adjustment of at least one of a position of the computing device, an orientation of the computing device, or a head posture; and trigger the output of the second prompt including guidance directing an eye gaze of the user relative to the computing device. In some implementations, the instructions cause the at least one processor to output the guidance including at least one of directing the user to gaze at a camera of the computing device; or triggering display of a focus object on a display device of the computing device and directing the user to gaze at the focus object.

In some implementations, the instructions cause the at least one processor to determine an ophthalmic fit for the head mounted wearable computing device based on a plurality of optical measurements for incorporation of corrective lenses into the head mounted wearable computing device; and adapt the configuration of the head mounted wearable computing device to accommodate the ophthalmic fit.

In another general aspect, a method may include receiving, by a server computing device from an application executing on a user computing device, a three-dimensional model of a head of a user, the three-dimensional model being based on image data of the head of the user captured by the user computing device; analyzing, by a simulation engine, the three-dimensional model received from the user computing device; detecting, by the simulation engine, a plurality of physical features and a plurality of optical measurements within the three-dimensional model received from the user computing device based on the analyzing; and configuring, by the simulation engine, a head mounted wearable computing device for a user of the user computing device based on the three-dimensional model of the head of the user.

In some implementations, configuring the head mounted wearable computing device for the user of the user computing device includes determining display fit measurements based on the three-dimensional model of the head of the user; accessing, from a database of the server computing device, previously stored configuration information associated with a plurality of previously stored head mounted wearable computing devices; and matching the display fit measurements and the plurality of optical measurements with at least one of the plurality of previously stored head mounted wearable computing devices. In some implementations, configuring the head mounted wearable computing device for the user of the user computing device includes determining an ophthalmic fit for the head mounted wearable computing device based on the three-dimensional model of the head of the user and the plurality of optical measurements for incorporation of corrective lenses into the head mounted wearable computing device; and adapting the configuration of the head mounted wearable computing device to accommodate the ophthalmic fit.

The details of one or more implementations are set forth in the accompanying drawings and the description below. Other features will be apparent from the description and drawings, and from the claims.

BRIEF DESCRIPTION OF THE DRAWINGS

FIG. 1A illustrates an example system, in accordance with implementations described herein.

DETAILED DESCRIPTION

Figure 1B:
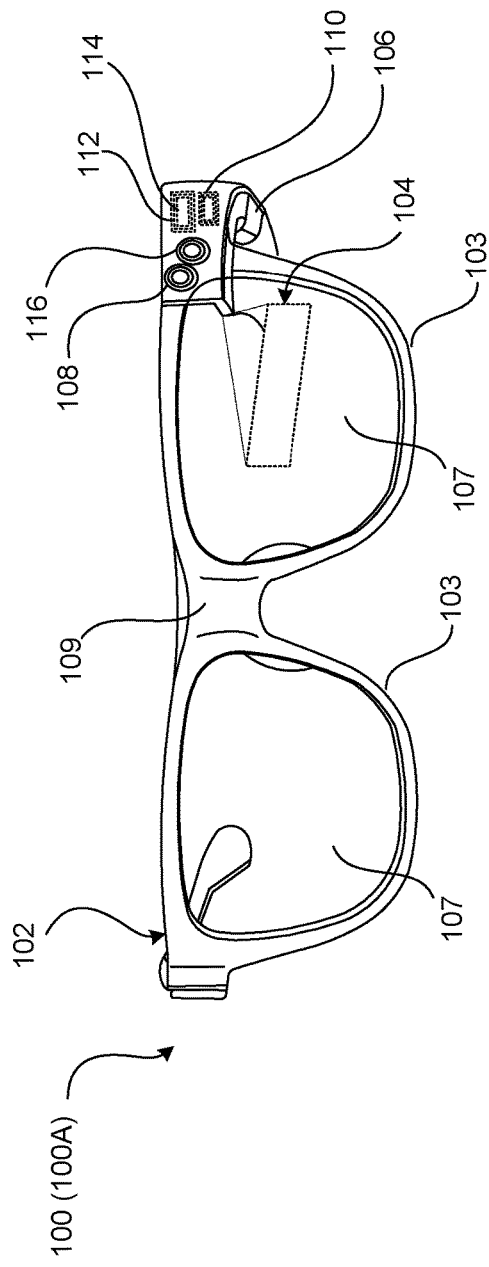
FIG. 1B is a front view.

This disclosure relates to systems and methods for determining display fit measurements and ophthalmic fit measurements for a wearable computing device. Systems and methods, in accordance with implementations described herein, provide for the collection of display fit measurements and/or ophthalmic fit measurements for a wearable computing device based on measurements of physical attributes of a user detected within an image capture. Systems and methods, in accordance with implementations described herein, provide for the collection of display fit measurements and/or ophthalmic fit measurements using a fit simulator, or a sizing simulator that uses image capture data collected through an application executed by a computing device. In some examples, systems and methods as described herein may provide for the collection of display fit measurements and/or ophthalmic fit measurements from image capture data, for wearable computing devices in the form of smart glasses that include both a display and corrective/prescription lenses that are customized for the particular physical attributes, needs and preferences of a particular user. The collection of display fit measurements and/or ophthalmic fit measurements using an image based data capture system and method may allow a wearable computing device, such as, for example, smart glasses and other such wearable computing devices, to be customized for the specific needs, preferences and functionality associated with a particular user, without the need to access a physical retail establishment.

Hereinafter, systems and methods, in accordance with implementations described herein, will be described with respect to the fitting of a wearable computing device in the form of a head mounted display device, such as, for example, smart glasses including a display device, such that content displayed by the display device is viewable by/visible to a user wearing the wearable computing device. In a situation in which the user would benefit from a wearable computing device including corrective lenses, these systems and methods may provide for the collection of ophthalmic fit measurements, allowing for the incorporation of corrective/prescription lenses into the wearable computing device, and for taking into account the features of the corrective/prescription lenses in the configuration of the display device for the wearable computing device. That is, systems and methods, in accordance with implementations described herein, may collect display fit measurements and/or ophthalmic fit measurements using an image based capture system and method to provide for the fitting of a display device and corrective/prescription lenses such that content displayed by the display device is visible to the user wearing the wearable computing device.

FIG. 1A illustrates a user operating mobile computing devices in a system in which the mobile computing devices can access one or more external resources 1100 via a network 1200. FIG. 1A provides a third person view of a user in an ambient environment 1000, including various examples of mobile computing devices. FIG. 1A shows example mobile computing devices including a first head worn wearable computing device 100/100A, a second head worn wearable computing device 100/100B, a wrist worn computing device 100/100C, and a handheld computing device 190. In some examples, the first head worn computing device 100A can include various components including for example a display, a camera that can capture images of the ambient environment, audio input/output capability, user input capability and the like, such as in a head mounted display device, in the form of smart glasses, or a headset. In some examples, the second head worn computing device 100B can be an ear worn computing device such as headphones, or earbuds, and can include audio input/output capability, a camera that can capture images of the ambient environment, user input capability and the like. In some examples, the wrist worn computing device 100C can include a display, a camera that can capture images of the ambient environment, audio input/output capability, user input capability and the like, such as in a smart watch, or wristband. In some examples, the handheld computing device 190 can include a display, a camera that can capture images of the ambient environment, audio input/output capability, user input capability, and the like, such as in a smartphone. FIG. 1A illustrates just some examples of mobile computing devices. The principles to be described herein may be applied to other types of mobile computing devices not specifically shown in FIG. 1A. In some examples, the mobile computing devices, including the example computing devices shown in FIG. 1A, can communicate with each other and/or with the external resources 1100, to exchange information, to receive and transmit input and/or output, and the like.

Figure 1C:
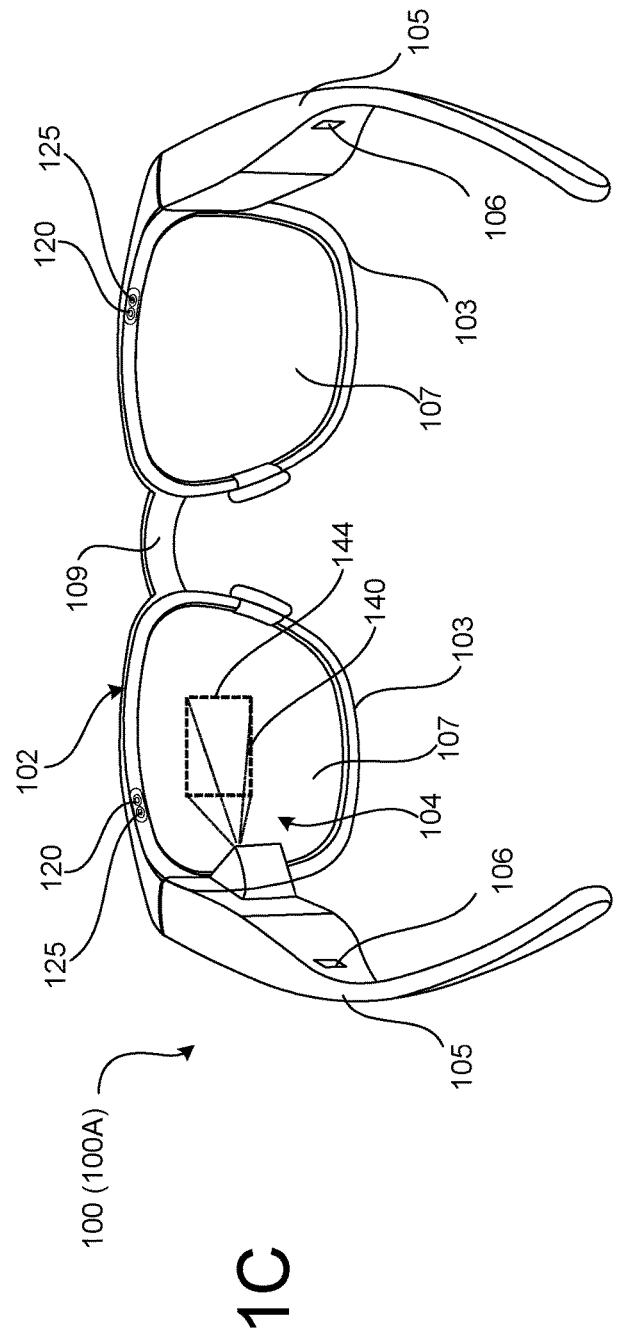
FIG. 1C is a rear view, of an example wearable computing device shown in FIG. 1A, in accordance with implementations described herein.

FIG. 1B is a front view, and FIG. 1C is a rear view, of an example wearable computing device 100. In some implementations, the example wearable computing device 100 may take the form of a pair of smart glasses, or augmented reality glasses, as in the example shown in FIGS. 1B and 1C, or an augmented reality and/or virtual reality headset or goggles, and the like. Hereinafter, systems and methods in accordance with implementations described herein will be described with respect to the wearable computing device 100 in the form of smart glasses, simply for ease of discussion and illustration. The principles to be described herein can be applied to other types of wearable computing devices and/or combinations of mobile/wearable computing devices working together.

As shown in FIG. 1B, the example wearable computing device 100 includes a frame 102. In the example shown in FIGS. 1B and 1C, the frame 102 includes rim portions 103 surrounding glass portion(s) 107, or lenses 107, and arm portions 105 coupled to a respective rim portion 103. In some examples, the lenses 107 may be corrective/prescription lenses. In some examples, the lenses 107 may be glass portions that do not necessarily incorporate corrective/prescription parameters. In some examples, a bridge portion 109 may connect the rim portions 103 of the frame 102. A display device 104 may be coupled in a portion of the frame 102. In the example shown in FIGS. 1A and 1B, the display device 104 is coupled in the arm portion 105 of the frame 102, with an eye box 140 extending toward the lens(es) 107, for output of content at an output coupler 144 at which content output by the display device 104 may be visible to the user. In some examples, the output coupler 144 may be substantially coincident with the lens(es) 107. The wearable computing device 100 can also include an audio output device 106 (such as, for example, one or more speakers), an illumination device 108, a sensing system 110, a control system 112, at least one processor 114, and an outward facing image sensor 116, or camera 116. In some implementations, the display device 104 may include a see-through near-eye display. For example, the display device 104 may be configured to project light from a display source onto a portion of teleprompter glass functioning as a beamsplitter seated at an angle (e.g., 30-45 degrees). The beamsplitter may allow for reflection and transmission values that allow the light from the display source to be partially reflected while the remaining light is transmitted through. Such an optic design may allow a user to see both physical items in the world, for example, through the lenses 107, next to content (for example, digital images, user interface elements, virtual content, and the like) generated by the display device 104. In some implementations, waveguide optics may be used to depict content on the display device 104.

In some implementations, the wearable computing device 100 may include a gaze tracking device 120 including, for example, one or more sensors 125, to detect and track eye gaze direction and movement. Data captured by the sensor(s) 125 may be processed to detect and track gaze direction and movement as a user input. In some implementations, the sensing system 110 may include various sensing devices and the control system 112 may include various control system devices including, for example, one or more processors 114 operably coupled to the components of the control system 112. In some implementations, the control system 112 may include a communication module providing for communication and exchange of information between the wearable computing device 100 and other external devices.

Numerous different sizing and fitting measurements and/or parameters may be taken into account when sizing and fitting a wearable computing device 100, such as the example smart glasses shown in FIGS. 1B and 1C, for a particular user. This may include, for example, wearable fit parameters that take into account how a frame 102 fits on a particular user and/or looks and/or feels on a particular user. Wearable fit parameters may take into account, for example whether the frame 102 is wide enough to be comfortable with respect to the user's temples, whether the rim portions 103 and bridge portion 109 are sized so that the bridge portion 109 can rest comfortably on the bridge of the user's nose, whether the arm portions 105 are sized to comfortably rest on the saddle points of the user's ears, and other such comfort related considerations. Wearable fit parameters may take into account as-worn parameters including how the user naturally wears the wearable computing device 100, such as, for example, head posture/how the user naturally holds his/her head, how the user positions the wearable computing device 100 relative to his/her face, and the like. Wearable fit parameters may also take into account whether the size and/or shape and/or contour of the frame 102 is aesthetically pleasing to the user, and is compatible with the user's facial features.

Display fit parameters, or display fit measurements may be taken into account when sizing and fitting the wearable computing device 100 for a particular user. Display fit parameters may provide an indication of placement of the display device 104 so that content displayed by the display device 104 is visible to the user. For example, display fit parameters may provide an indication of placement of the display device 104 so that content displayed by the display device 104 is captured within at least a set portion of the field of view of the user. For example, in some implementations, the display fit parameters may be used to provide at least a set level of gazability. Gazability may correspond to an amount, or portion, or percentage of the display of content that is visible to the user at a set brightness level and a set pupil size at a periphery (for example, a least visible corner) of the field of view of the user. In some examples, the display fit parameters may be used to configure the display device 104 to provide the best possible placement of the display of content to the user. In some examples, the display fit parameters may be used to select an arrangement of the display device 104/frame 102, from a plurality of available, or stocked arrangements, that will provide the best possible placement of the display of content to the user.

Figure 2A:
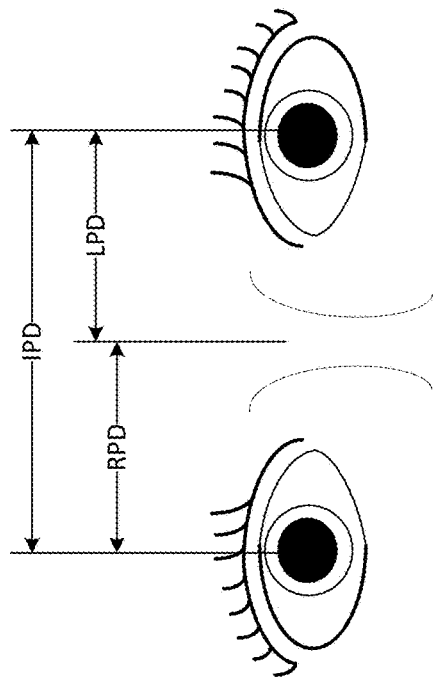
FIGS. 2A-2D illustrate example ophthalmic measurements.
Figure 2B:
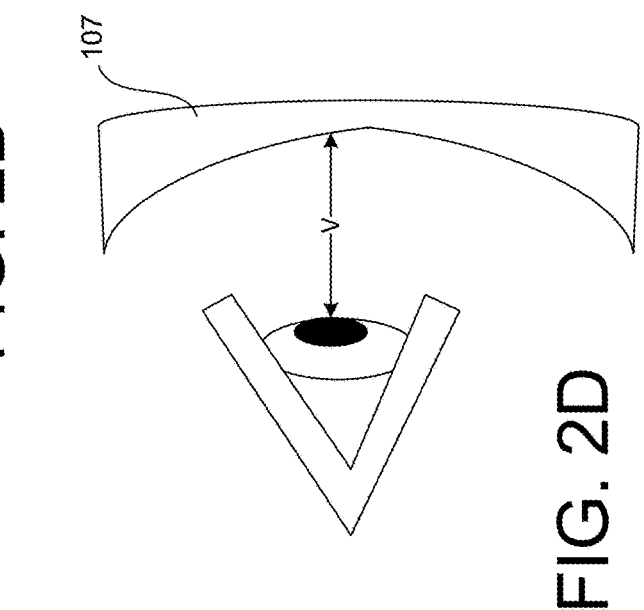
Figure 2C:
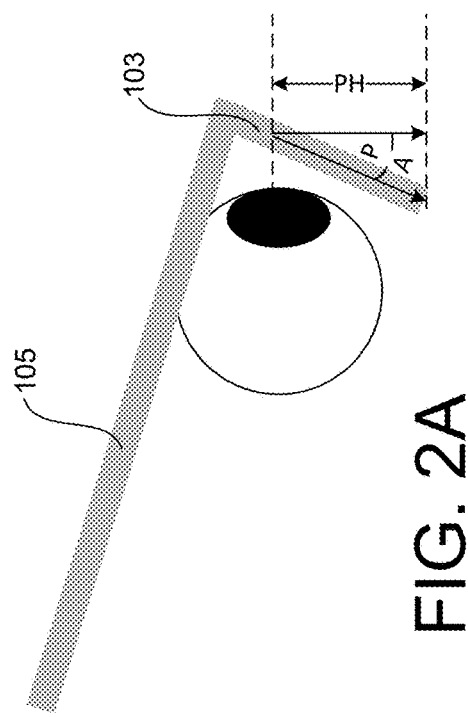
Figure 2D:
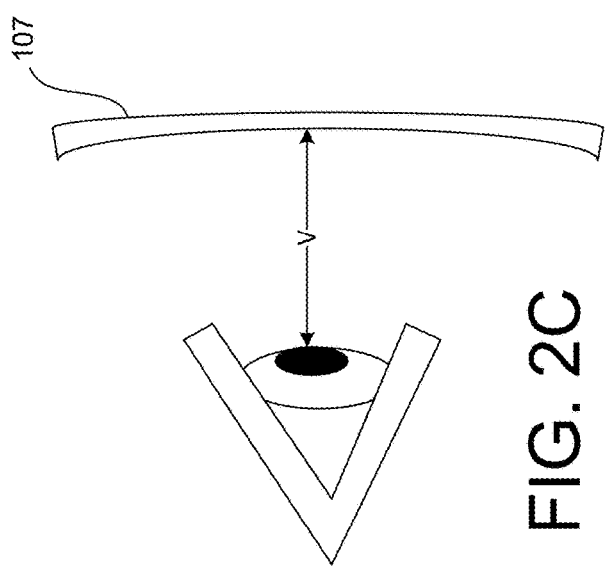

In some examples, ophthalmic fit parameters, or ophthalmic fit measurements may be taken into account when sizing and fitting the wearable computing device 100 in which the lenses 107 are prescription, or corrective lenses. Some example ophthalmic fit measurements are shown in FIGS. 2A-2D. Ophthalmic fit measurements may include, for example, a pupil height PH (a distance from a center of the pupil to a bottom of the lens 107), an interpupillary distance IPD (a distance between the pupils), a monocular pupil distance, for example, a left pupil distance LPD (a distance from a central portion of the bridge of the nose to the left pupil) and a right pupil distance RPD (a distance from the central portion of the bridge of nose to right pupil), a pantoscopic angle PA (an angle defined by the tilt of the lens 107 with respect to vertical), a vertex distance V (a distance from the cornea to the lens 107), and other such parameters, or measures. FIG. 2C illustrates a vertex distance V associated with a relatively low diopter lens 107. FIG. 2D illustrates a vertex distance V associated with a relatively higher diopter lens 107. Ophthalmic fit measurements may be taken into account when fitting the wearable computing device 100, including the display device 104, for the user. For example, ophthalmic fit measurements (together with display fit measurements) may provide for placement of the display of content by the display device 104 within an eye box defined by a three-dimensional volume extending between the lens 107 and the eye of the user, where the display of content will be within the field of view of the user, and thus visible to the user.

A system and method, in accordance with implementations described herein, may use a computing device to capture image based data from which display fit measurements and/or ophthalmic fit measurements may be detected. Detection of the display fit measurements and/or the ophthalmic fit measurements may be used by a sizing simulator, or a fit simulator, to size and fit a wearable computing device including and display and/or corrective lenses for a specific user. The image capture data may be captured by a user of the computing device in an unsupervised, or unproctored manner. This may allow the display fit measurements and/or ophthalmic fit measurements to be collected without access to a retail establishment, without the need for an appointment with a fitting/sales professional and the like. In some examples, the image capture may be accomplished by the user operating an application executing on the user's personal computing device. The application executing on the user's personal computing device may provide for image capture in an unsupervised manner, without the need for a separate proctor to capture the image data, either in person or virtually. In some examples, the application executing on the user's personal computing device may invoke a self-portrait mode of operation, or a selfie mode of operation of the computing device. In some implementations, three-dimensional head pose and/or physical landmark data (i.e., facial landmark data, cranial landmark data, contouring and other such data which may be used to define facial features and head features of the user) may be captured using an image sensor, or a camera, of the computing device of the user without relying on data collected by a depth sensor. In some implementations, three-dimensional head pose data and/or physical landmark data may be collected by a depth sensor included in the mobile computing device of the user.

Figure 3:
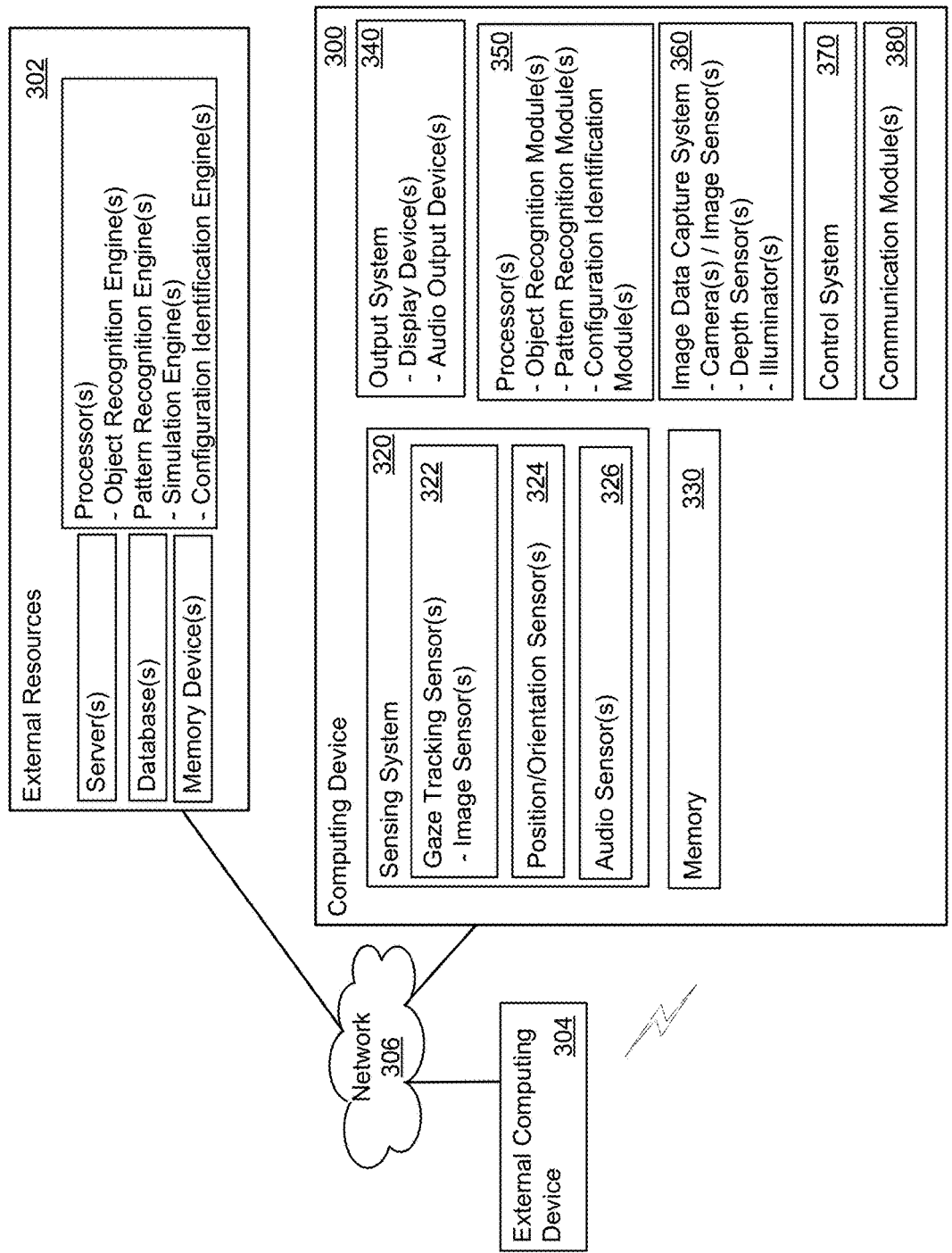
FIG. 3 is a block diagram of a system, in accordance with implementations described herein.

FIG. 3 is a block diagram of an example system for determining display fit measurements and/or ophthalmic fit measurements for a wearable computing device using a sizing simulator, or a fit simulator, in accordance with implementations described herein. The system may include one or more computing devices 300. The computing device 300 can communicate selectively via a network 306 to access external resources 302 such as, for example, server computer systems, processors, databases, memory storage, and the like. The computing device 300 can operate under the control of a control system 370. The computing device 300 can communicate with one or more external computing devices 304 (another wearable computing device, another mobile computing device and the like) either directly (via wired and/or wireless communication), or via the network 306. In some implementations, the computing device 300 includes a communication module 380 to facilitate external communication. In some implementations, the computing device 300 includes a sensing system 320 including various sensing system components including, for example one or more image sensors 322, one or more position/orientation sensor(s) 324 (including for example, an inertial measurement unit, accelerometer, gyroscope, magnetometer and the like), one or more audio sensors 326 that can detect audio input, and other such sensors. The computing device 300 can include more, or fewer, sensing devices and/or combinations of sensing devices.

In some implementations, the computing device 300 may include one or more image sensor(s), or camera(s) 360. The camera(s) 360 can include, for example, outward facing cameras, world facing cameras, and the like that can capture still and/or moving images of an environment outside of the computing device 300. In some implementations, the one or more camera(s) 360 may include a depth sensor. The still and/or moving images may be displayed by a display device of an output system 340 and/or transmitted externally via the communication module 380 and the network 306, and/or stored in a memory 330 of the computing device 300. The computing device 300 may include one or more processor(s) 350. The processors 350 may include various modules or engines configured to perform various functions. In some examples, the processor(s) 350 include object recognition module(s), pattern recognition module(s), configuration identification modules(s), and other such processors. The processor(s) 350 may be formed in a substrate configured to execute one or more machine executable instructions or pieces of software, firmware, or a combination thereof. The processor(s) 350 can be semiconductor-based that include semiconductor material that can perform digital logic. The memory 330 may include any type of storage device that stores information in a format that can be read and/or executed by the processor(s) 350. The memory 330 may store applications and modules that, when executed by the processor(s) 350, perform certain operations. In some examples, the applications and modules may be stored in an external storage device and loaded into the memory 330.

Figure 4A:
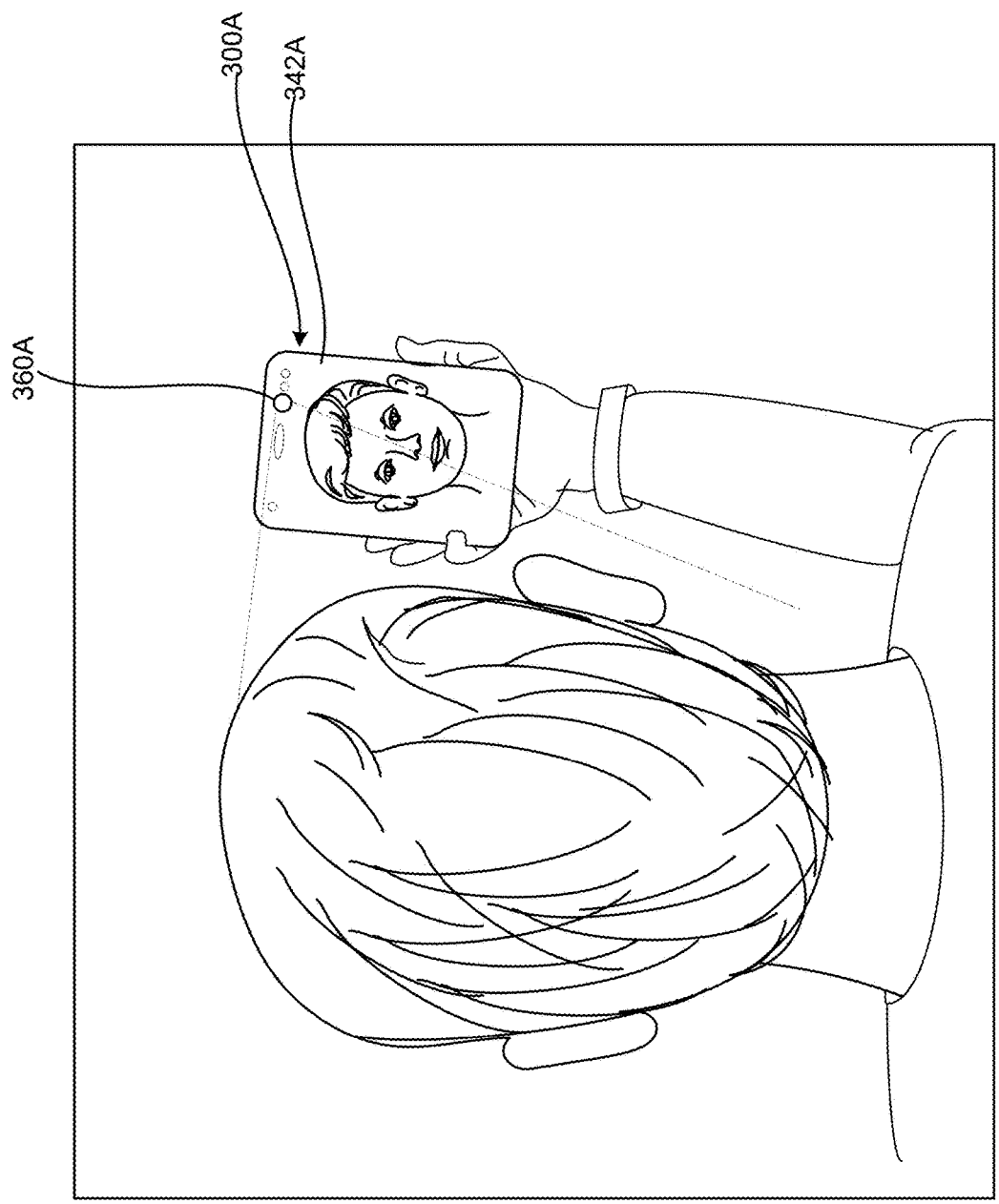
FIGS. 4A-4B illustrate image capture modes for determining display fit measurements and ophthalmic fit measurements, in accordance with implementations described herein.
Figure 4B:
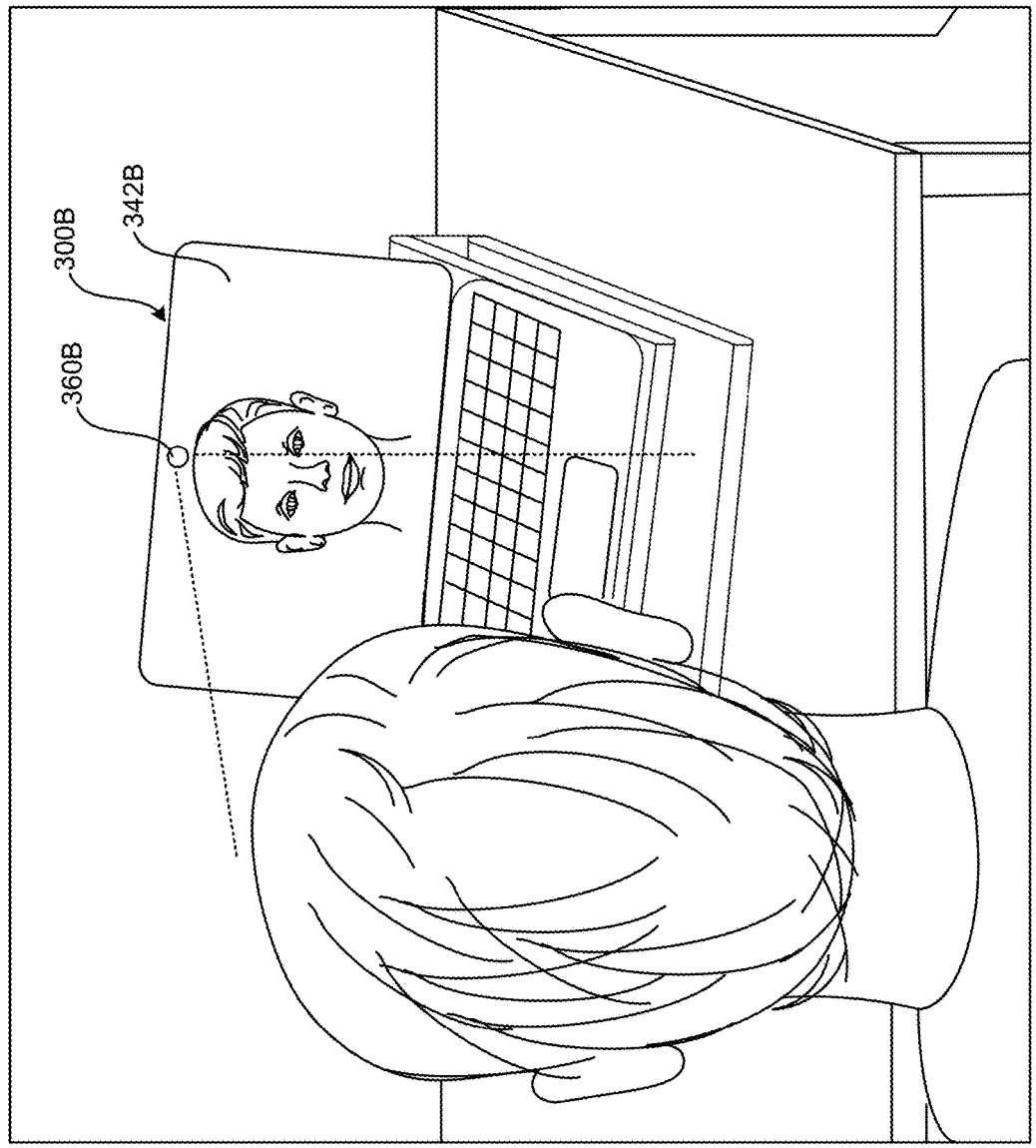

FIGS. 4A and 4B illustrate example computing devices, such as the computing device 300 described above with respect to FIG. 3, operated by a user to capture display fit measurements and/or ophthalmic fit measurements for a wearable computing device to be customized for use by the user. In FIG. 4A, the example computing device 300A is in the form of a handheld computing device, such as a smartphone. In FIG. 4B, the example computing device 300 is in the form of a laptop computing device 300B. FIGS. 4A and 4B provide two examples of computing devices 300 which may be used to capture image data for processing by a sizing simulator, or a fit simulator, to carry out the systems and methods described herein. The principles to be described herein may be carried out by other types of computing devices, and in particular computing devices capable of executing applications thereon to make use of image capture capability, display capability, and external communication and processing to collect and process display fit measurements and/or ophthalmic measurements for customizing a wearable computing device for a particular user.

In the example shown in FIG. 4A, the user is holding the example handheld computing device 300A so that the head and face of the user is in the field of view of a camera 360A of the computing device 300A, and the camera 360A can capture an image of the head and face of the user. The image capture may be displayed to the user on a display device 342A of the computing device 300A, so that the user can verify that his/her head and face are captured within the field of view of the camera 360A. Similarly, as shown in FIG. 4B, the example laptop computing device 300B is positioned relative to the user so that the head and face of the user are captured within the field of view of the camera 360B of the computing device 300B, and the camera 360B can capture an image of the head and face of the user. In the example arrangement shown in FIG. 4B, the example laptop computing device 300B is in an elevated position on a work surface, so that the camera 360B of the computing device 300B can be aligned with a natural head and face position of the user. The captured image may be displayed to the user on a display device 342B of the computing device 300B, so that the user can verify that his/her head and face are captured within the field of view of the camera 360B. In the example arrangements shown in FIGS. 4A and 4B, image capture data captured by the camera 360 may be processed (for example, by recognition engine(s) and simulation engine(s) of external processor(s) as shown in FIG. 3) to detect display fit measurements and/or ophthalmic fit measurements, and to determine for example, frame and/or lens sizing, fitting, contouring and the like, display device configuration, and the like for the customization of a wearable computing device, such as, for example, the head mounted wearable computing device 100 shown in FIGS. 1B and 1C for the user.

Systems and methods, in accordance with implementations described herein, may develop a model, for example, a three-dimensional model or a depth map, of the face and/or head of the user based on image data captured by the computing device operated by the user. A simulation may be applied to the model, for example the three-dimensional model, to virtually fit configurations of head mounted wearable computing devices on the three-dimensional model, to select a head mounted wearable computing device for the user. The fitting simulation may make use of detectable user features in the three-dimensional model and known features of available head mounted wearable computing devices to fit the head mounted wearable computing device for the user. In some examples, an output of the simulation may include one or more frame selections which may produce a wearable fit and a display fit which will allow the user to view content output by the display device of the head mounted wearable computing device. In some examples, the simulation may generate a three-dimensional model of the selected frames on the face of the user to predict ophthalmic fit measurements. This may allow the head mounted wearable computing device to be fitted to accommodate corrective/prescription lenses.

As noted above, in some examples, the image data may be captured by a computing device (such as the computing device 300 described above) operated by the user. This may allow image data to be captured, the simulation to be executed, and the head mounted wearable device to be fitted for the user without relying on access to a retail establishment, and without relying on a proctor to supervise the capture of image data and/or to capture the image data.

In an example in which the computing device 300 operated by the user includes a depth sensor, a depth map of the face of the user may be generated based on images captured from substantially one position of the computing device 300 relative to the head of the user. In an example in which the computing device 300 operated by the user does not include a depth sensor, a depth map of the face/head of the user may be generated based on images captured from different positions of the computing device 300 relative to the head of the user.

In some situations, a user may choose to use a personal computing device such as, for example, a smartphone or a laptop computer, as shown in FIGS. 4A and 4B, or other properly equipped personal computing device, to capture images from which wearable fit measurements and/or display fit measurements and/or ophthalmic fit measurements may be derived. The user may choose to use the personal computing device to capture these images in an unsupervised, or unproctored manner, using an application executing on the personal computing device, rather than, for example, in an appointment with a proctor or consultant, either virtually or in person/in a retail establishment. The ability to accomplish the fitting of a head mounted wearable computing device in this manner may provide the user with a convenient, uncomplicated, reliable process for the selection and purchase of the head mounted wearable computing device. Hereinafter, the process for the selection and purchase of the head mounted wearable computing device will be described with reference to the example smart glasses 100 shown in FIGS. 1B and 1C, for purposes of discussion and illustration. Principles to be described herein may be applied to other types of head mounted wearable computing devices.

In some examples, features of the application executing on the computing device, such as the example computing device 300 shown in FIGS. 3-4B, may facilitate the user-implemented capture of image data for use by the sizing/fit simulator in fitting a head mounted wearable computing device, such as the example smart glasses 100 shown in FIGS. 1B and 1C, for the user. For example, features of the application executing on the computing device 300 may facilitate the user capture of image data used to determine features such as head pose and eye gaze, which may in turn be used to size/fit the head mounted wearable computing device for the user.

For example, image data captured through user operation of a computing device such as, for example, the example computing devices 300 shown in FIGS. 3-4B, may be provided to the simulator for the development of a three-dimensional model of the face of the user. Based on the data associated with the three-dimensional model of the face, the simulator may select one or more frames, such as the example frame 102 of the smart glasses 100 shown in FIGS. 1B and 1C, which may meet the wearable fit and/or the display fit needs of the user. In some examples, the one or more frames may be selected from a plurality of different models of frames available for fitting. Known configuration information (sizing/fit, dimensions, shaping, contouring, tilt angle and other such configuration information) may be previously stored in a database in connection with the different models of frames. For example, the configuration information may be stored in a database that is accessible by the simulator, as in the external resources 302 that are in communication with the computing device 300 as shown in FIG. 3. The simulator may compare the facial features detected in the image data captured by the user operating the computing device 300 to the known configuration information of the different models of frames stored in the database. Based on the comparison, the simulator may match, or may determine that one or more frames may provide a fit (a wearable fit and/or a display fit) for the user.

In some examples, the sizing/fit simulator may analyze the image data provided by the computing device 300 and/or the three-dimensional model to extract and/or generate head pose information and eye gaze information to be used in fitting the wearable computing device 100 for the user.

Figure 5A:
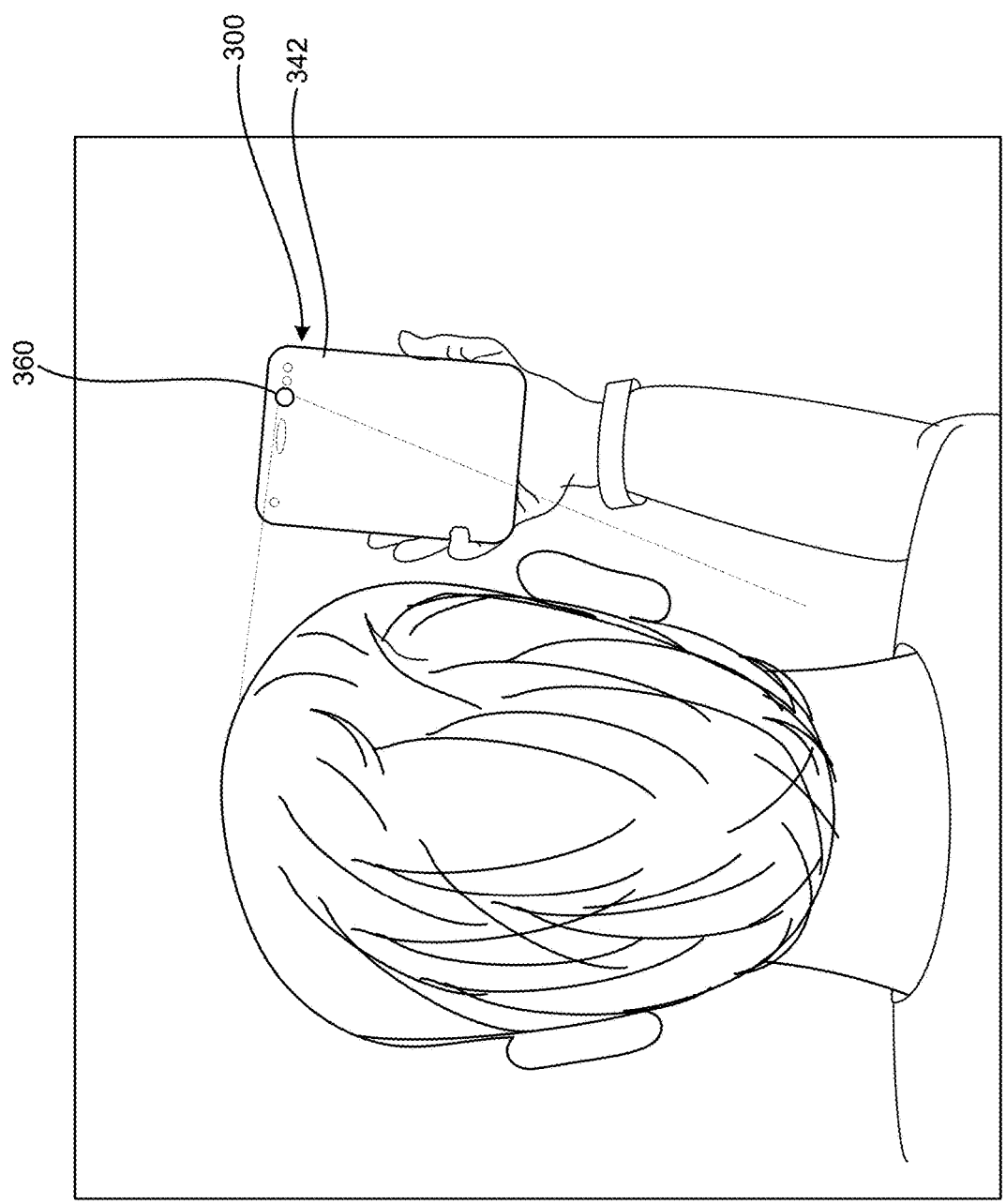
FIGS. 5A-5D illustrate an example process for capturing image data, in accordance with implementations described herein.

The capture of image data including a natural head pose, i.e., a manner in which the user naturally holds his/her head, is a component in the development of an accurate three-dimensional model of the user's face/head, and in the accurate sizing and/or fitting of the head mounted wearable computing device 100 for the user. In some examples, the capture of image data that is representative of the natural head pose of the user may be facilitated by user interaction with the application executing on the computing device 300 operated by the user. In the example shown in FIG. 5A, the computing device 300 is held by the user, with the front facing camera 360 of the computing device 300 facing the user, invoking operation in a self-portrait mode, or a selfie mode. The application executing on the computing device 300 for the sizing and/or fitting of the head mounted wearable computing device 100 for the user may invoke this mode of operation for the capture of image data, so as to capture images of the face/head of the user.

Figure 5B:
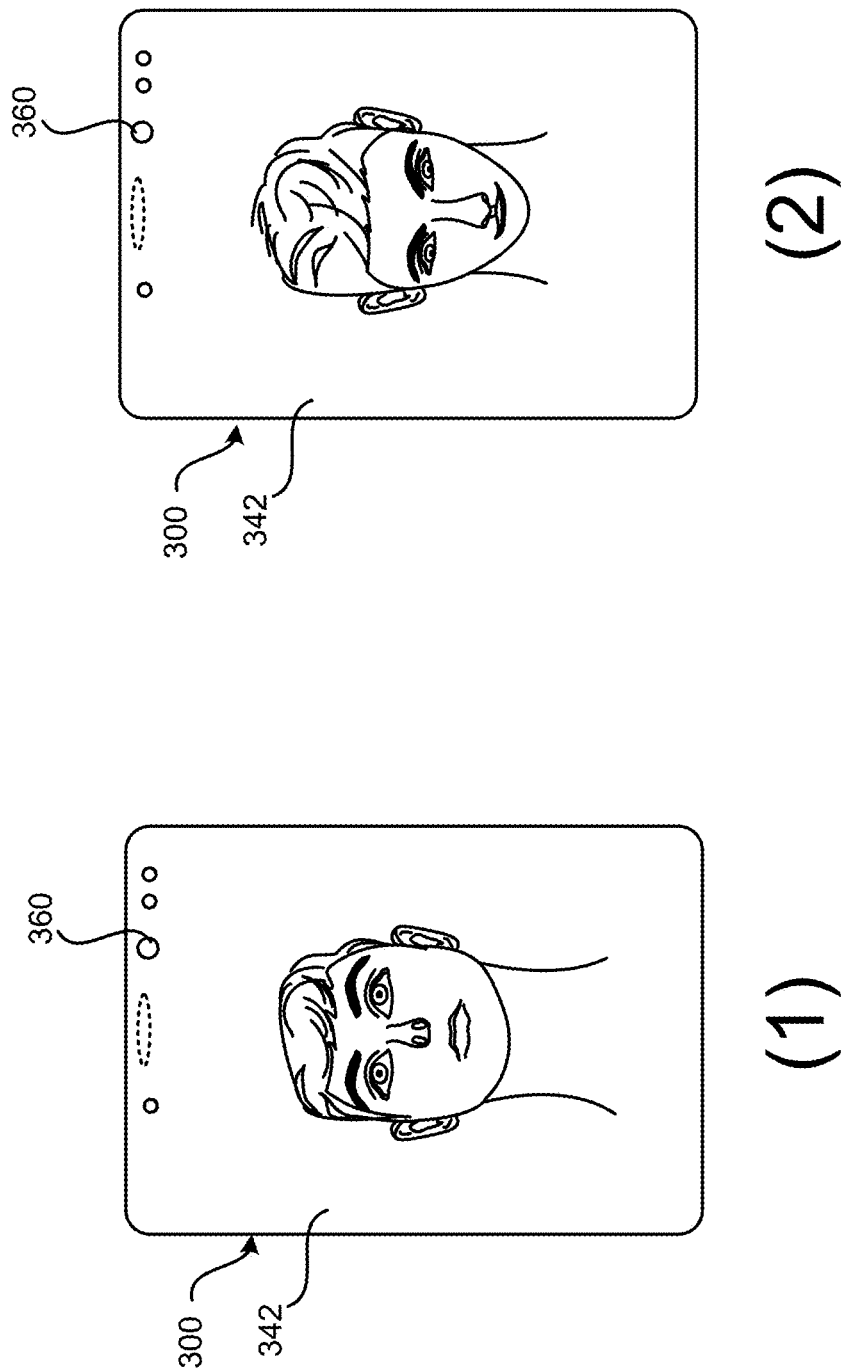
Figure 5C:
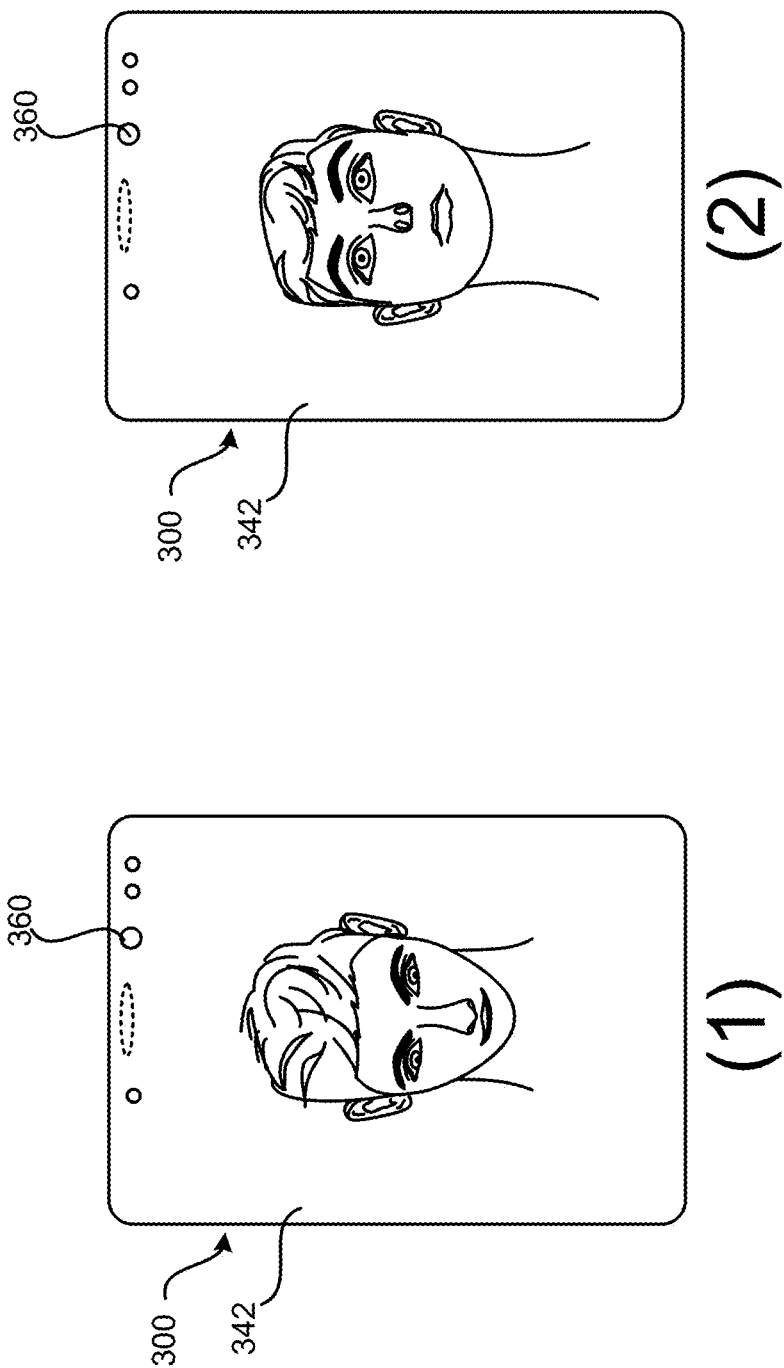
Figure 5D:
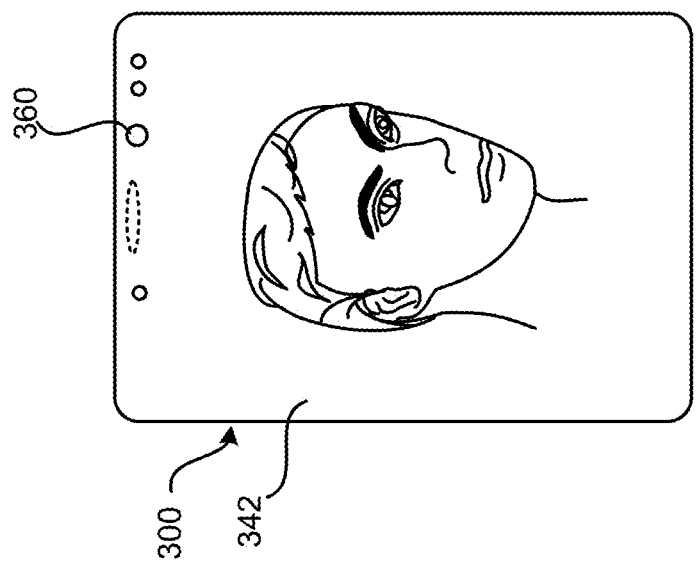

In some situations, a position of the computing device 300 relative to the face/head of the user may cause the user to hold his/her head in a position that does not correspond to his/her natural head position, or the natural three-dimensional pose of the head. For example, FIG. 5B(1) illustrates the image captured by the camera 360 of the computing device in a situation in which the computing device 300/camera 360 is held in a position above the head of the user, or above the natural line of sight of the user, causing the user to tilt his/her head upward, away from the user's natural head position. FIG. 5B(2) illustrates the image captured by the camera 360 of the computing device in a situation in which the computing device 300/camera 360 is held in a position above the head of the user, or above the natural line of sight of the user, but the user has not tilted his/her head upward to look towards the computing device 300/camera 360. FIG. 5C(1) illustrates the image captured by the camera 360 of the computing device in a situation in which the computing device 300/camera 360 is held in a position below the head, or the line of sight of the user, causing the user to tilt his/her head downward, away from the user's natural head position. FIG. 5C(2) illustrates the image captured by the camera 360 of the computing device in a situation in which the computing device 300/camera 360 is held in a position below the head, or the line of sight of the user, but the user has not tilted his/her head downward to look towards the computing device 300/camera 360. FIG. 5D illustrates the image captured by the camera 360 of the computing device in a situation in which the computing device 300/camera 360 is held in a position that is laterally offset from the head, or the line of sight of the user. In the examples shown in FIGS. 5B-5D, the captured image is not representative of the natural head pose of the user. Without an accurate three-dimensional representation of the natural head pose of the user, measures such as, for example, pantoscopic angle cannot be accurately determined, head/face shape, facial landmarks and contours and the like that may have an effect on the fitting of frames for a particular user cannot be accurately modeled, and the like. Similarly, in the examples shown in FIGS. 5B-5D, the captured image is not representative of the natural eye gaze of the user. Without an accurate representation of the natural eye gaze of the user, measures such as pupil height, interpupillary distance, focal points and the like cannot be accurately modeled.

Accuracy of the fitting of the head mounted wearable computing device 100 may be improved by an accurate determination of the natural three-dimensional head pose and an accurate determination of the natural eye gaze of the user. Accordingly, in some examples, the application executing on the computing device 300 may include features that guide the accurate capture of image data to provide for an accurate determination of the natural three-dimensional head pose and the natural eye gaze of the user. Guidance supplied during a fitting session for the accurate capture of image data maybe particularly beneficial in an otherwise unsupervised fitting session conducted by the user, without help and/or intervention by a proctor or agent, either virtually or in a retail establishment.

FIGS. 6A-6D illustrate example user interface screens of the application executing on the computing device 300 for the fitting of the head mounted wearable computing device 100 for the user operating the computing device 300. The user interface screens may be displayed to the user on the display device 342 of the computing device 300 during a fitting session, as image data is collected for the fitting of the head mounted wearable computing device 100. In the example user interface screens shown in FIGS. 6A-6D, an example image of the user is shown on the display device 342 of the computing device 300, simply to illustrate user head and gaze position relative to the computing device 300/camera 360. In implementation of the example user interface screens, the image of the user may or may not necessarily be displayed on the display device 342 of the computing device 300, particularly if display of the image causes the user to divert their gaze.

In some examples, a first interface screen 610 may be displayed on the display device 342 of the computing device 300 to provide guidance to the user in controlling head pose, so that an accurate determination of three-dimensional head pose of the user can be obtained from captured image data. In the example shown in FIG. 6A, an example prompt 611 is displayed in the example interface screen 610, prompting the user to hold the computing device 300 at eye level, to draw the head of the user into a natural head pose. In some examples, the prompt may be an audible prompt, output by an audio output device 344, or speaker 344 of the computing device 300. In some examples, after a set threshold has been met, it may be determined that data for the three-dimensional head pose has been obtained and that three-dimensional head pose has been determined. In some examples, a progress indicator may be output to provide an indication of progress, and completion. In the example shown in FIG. 6A, a visual progress indicator 615 is displayed, in the form of, for example, a progress bar 615A, a progress meter 615B, or other type of visual indicator including for example, color changes in the displayed image, blinking of the prompt 611 and the other such visual indicators. In some examples, the indicator may be an audible indicator output by the speaker 344 of the computing device 300, providing an indication of progress, and completion. In some examples, the set threshold may be measured based on a set period of time that has elapsed since the output of the prompt 611. In some examples, the set threshold may be measured based on a detected movement of the computing device 300 (based on, for example, data provided by position and orientation sensors of the computing device 300). In some examples, the set threshold may be measured based on a detection of set features (such as, for example, facial landmarks such as the nose, chin and the like) in a stationary position in the captured image data for a set amount of time after the output of the prompt 611.

Figure 6A:
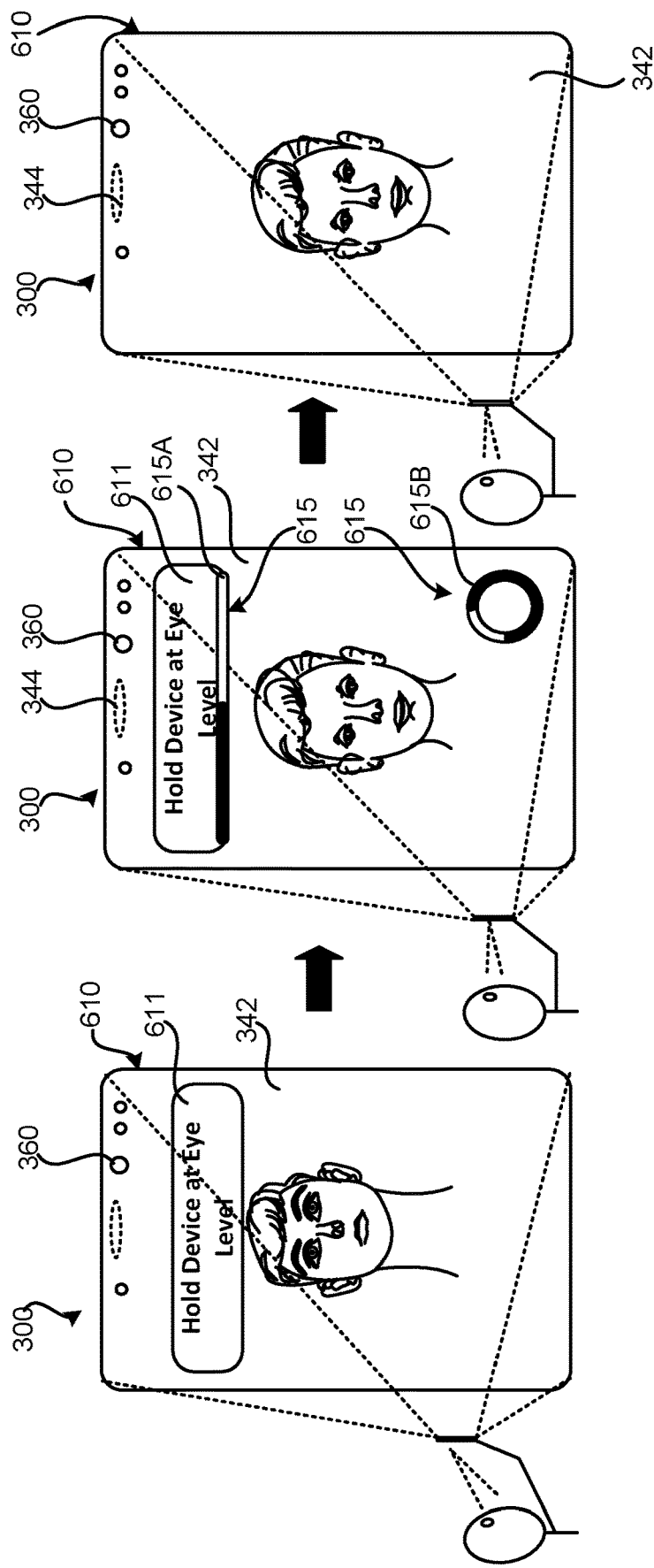
FIGS. 6A-6D illustrate an example process for capturing image data, in accordance with implementations described herein.
Figure 6B:
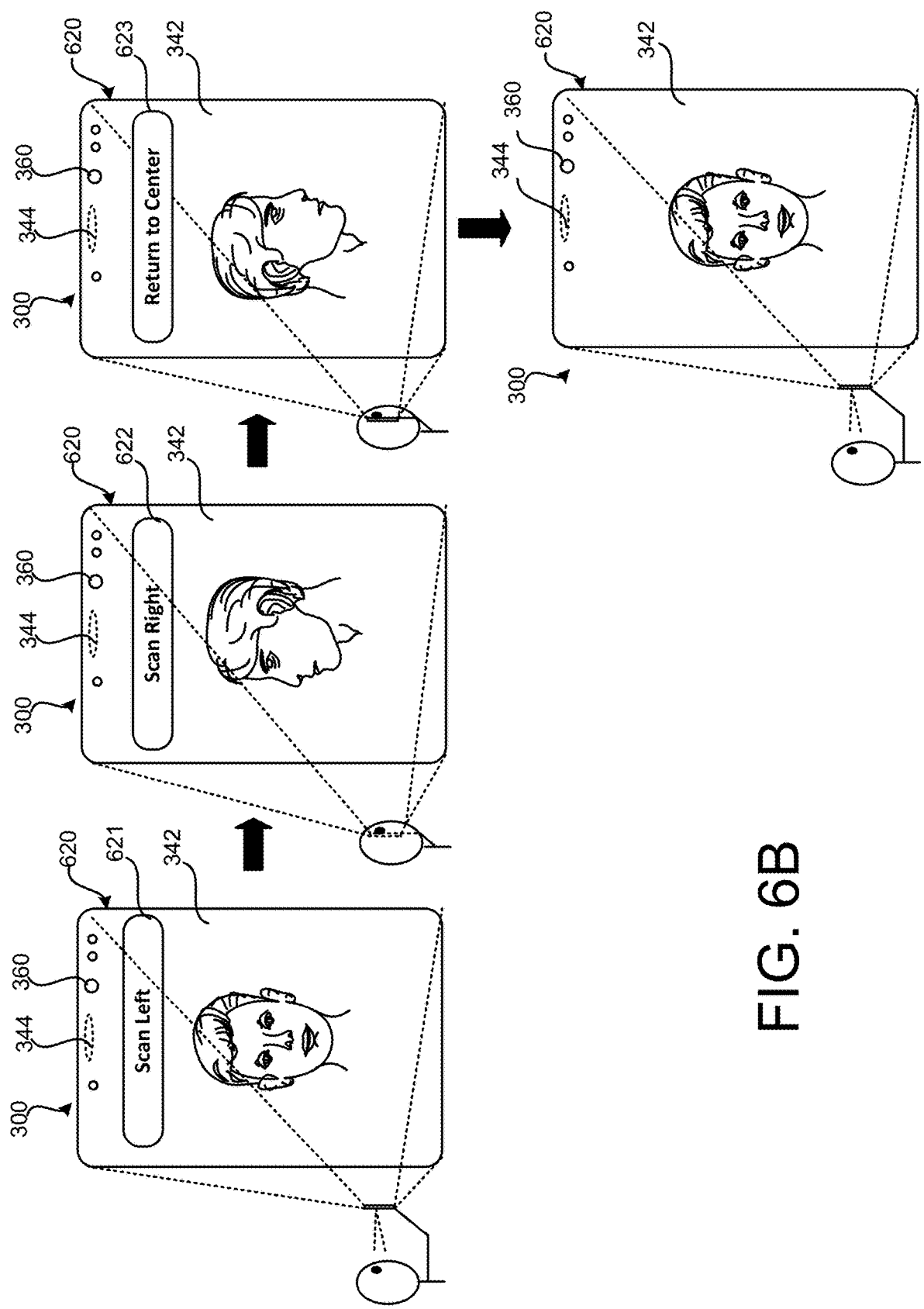
Figure 6C:
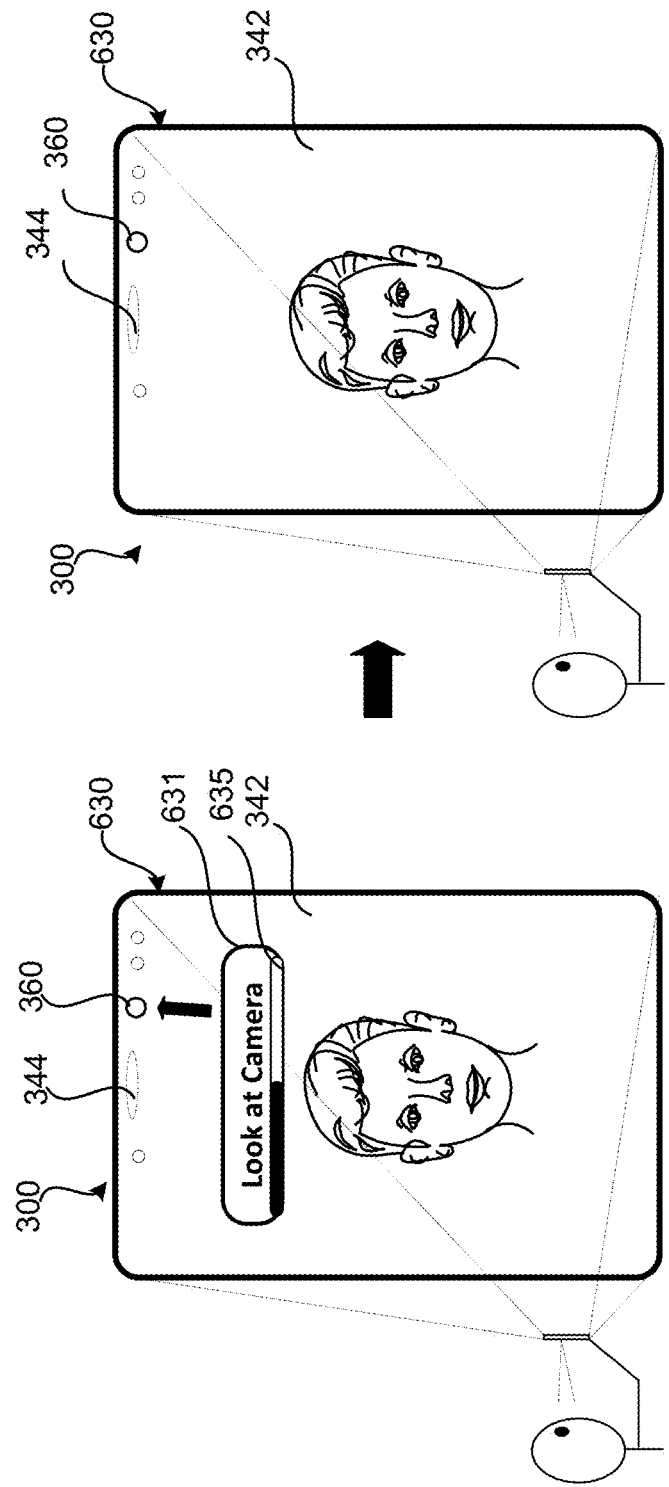

In some examples, a second interface screen 620 may be displayed on the display device 342 of the computing device 300, as shown in FIG. 6B. The second interface screen 620 may provide guidance to the user in capturing additional image data related to the modeling of the three-dimensional head pose. In the example shown in FIG. 6B, an example first prompt 621 instructing the user to scan to the left, an example second prompt 622 instructing the user to scan to the right, and an example third prompt 623 instructing the user to return to the central position, are output as visual prompts 621, 622, 623 displayed on the display device 342. In some examples, these prompts may be output as audible prompts by the audio output device 344 of the computing device 300. These scans may provide for the collection of additional image data for the modeling of the three-dimensional head pose. This additional data may be useful when, for example, the camera 360 of the computing device 300 does not include depth sensing capability. As noted above, in some examples, the prompts may be output in the form of audible prompts, prompting the user to scan to the left, and to scan to the right, and/or to provide an indication of when the scanning is complete.

In some examples, data provided by sensors of the computing device 300 including for example, positional sensors, orientation sensors and the like, together with the image data, may be used to provide the user with feedback and further correction of the orientation of the computing device 300 relative to the user's face/head, distance from the user's face/head, and the like. For example, based on data provided by position and/or orientation sensors of the computing device 300, one or more prompts may be output to the user. These additional prompts may include, for example, a prompt indicating that the user hold the computing device 300 in a more upright, or straight, or vertical position, that the user move the computing device 300 so that the capture area is centered on the user's face, that the user move the computing device 300 closer to or further from the user's face, that the user move the computing device 300 vertically upward or downward, and other such prompts, to improve the capture of image data.

The application executing on the computing device 300 may provide guidance in the capture of image data that will allow the user's eye gaze to be determined, and for measurements such as, for example interpupillary distance and/or monocular pupillary distance, pupil height, and the like. Images related to the detection of this data may be obtained in an arrangement in which the user has established the natural head pose as described above. In some examples, the application may guide the eye gaze of the user so that relevant measurements may be taken from the image data collected.

In some examples, a third interface screen 630 may be displayed on the display device 342 of the computing device 300 to provide guidance to the user in capturing image data from which gaze data can be extracted. In the example shown in FIG. 6C, an example prompt 631 is displayed in the example interface screen 630, guiding the user to direct their gaze at the camera 360. In the example shown in FIG. 6C, the prompt 631 includes an arrow pointing at the camera, to facilitate the location of the camera 360 by the user. That is, in some examples, the camera 360 may be positioned in a bezel portion of the computing device 300, and difficult to locate. The camera may be particularly difficult to locate for a user who has removed their corrective lenses for the purposes of the fitting session, and thus may find it difficult to locate the camera 360 without assistance. In some examples, the prompt may be an audible prompt, output by an audio output device 344, or speaker 344 of the computing device 300, prompting the user to direct their gaze to the camera 360. In some examples, after a set threshold has been met, it may be determined that the image data captured provides the ocular measurements for determining display fit for the user. In some examples, a progress indicator may be output to provide an indication of progress, and completion. In the example shown in FIG. 6C, a visual progress indicator 635 is displayed, in the form of, for example, a progress bar 635, or other type of visual indicator including for example, color changes in the displayed image, blinking of the prompt 631 and the other such visual indicators. In some examples, the indicator may be an audible indicator output by the speaker 344 of the computing device 300, providing an indication of progress, and completion. In some examples, the set threshold may be measured based on a set period of time that has elapsed since the output of the prompt 631. In some examples, the set threshold may be measured based on a detected dwell time of the computing device 300 (based on, for example, data provided by position and orientation sensors of the computing device 300). In some examples, the set threshold may be measured based on a detection of set features in a stationary position in the captured image data for a set amount of time after the output of the prompt 631, indicating that the user gaze has stabilized.

Figure 6D:
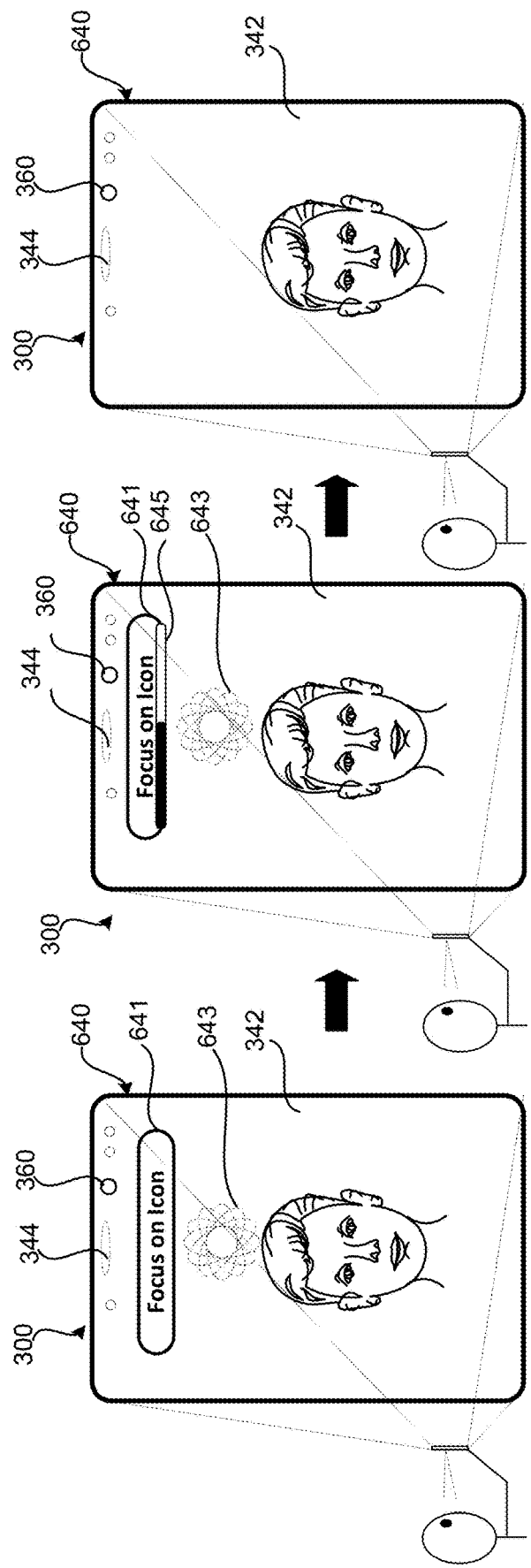

FIG. 6D illustrates a fourth interface screen 640, that may be displayed instead of, or in addition to, the third interface screen 630 to provide guidance to the user in capturing image data from which gaze data can be extracted. In the example shown in FIG. 6D, an example prompt 641 is displayed in the example interface screen 640, guiding the user to direct their gaze at an icon 643 displayed on the display device 342. In some situations, the icon 643 may provide for a relatively easy object of focus, and gaze fixation may be obtained relatively quickly. In some examples, the prompt may be an audible prompt, output by an audio output device 344, or speaker 344 of the computing device 300, prompting the user to direct their gaze to the icon 643. In some examples, after a set threshold has been met, it may be determined that the image data captured provides the ocular measurements for determining display fit for the user. In some examples, a progress indicator may be output to provide an indication of progress, and completion. In the example shown in FIG. 6D, a visual progress indicator 645 is displayed, in the form of, for example, a progress bar 645, or other type of visual indicator including for example, color changes in the displayed image, blinking of the prompt 641 and the other such visual indicators. In some examples, the indicator may be an audible indicator output by the speaker 344 of the computing device 300, providing an indication of progress, and completion. In some examples, the set threshold may be measured based on a set period of time that has elapsed since the output of the prompt 641. In some examples, the set threshold may be measured based on a detected dwell time of the computing device 300 (based on, for example, data provided by position and orientation sensors of the computing device 300). In some examples, the set threshold may be measured based on a detection of set features in a stationary position in the captured image data for a set amount of time after the output of the prompt 641, indicating that the user gaze has stabilized.

In some examples, the application executing on the computing device 300 may cause the display device 342 to output a monochrome display screen such as, for example, a substantially white display screen during the capture of image data. The monochrome display screen may be reflected in the pupils of the user gazing at the computing device 300. If, in the analysis of the image data, it is determined that the reflection of the monochrome display screen is not centered in the pupils of the user, it may be determined that the user gaze is not properly focused on or directed at the camera 360. In this situation, the system may prompt the user to initiate a re-capture of the image data.

Figure 7:
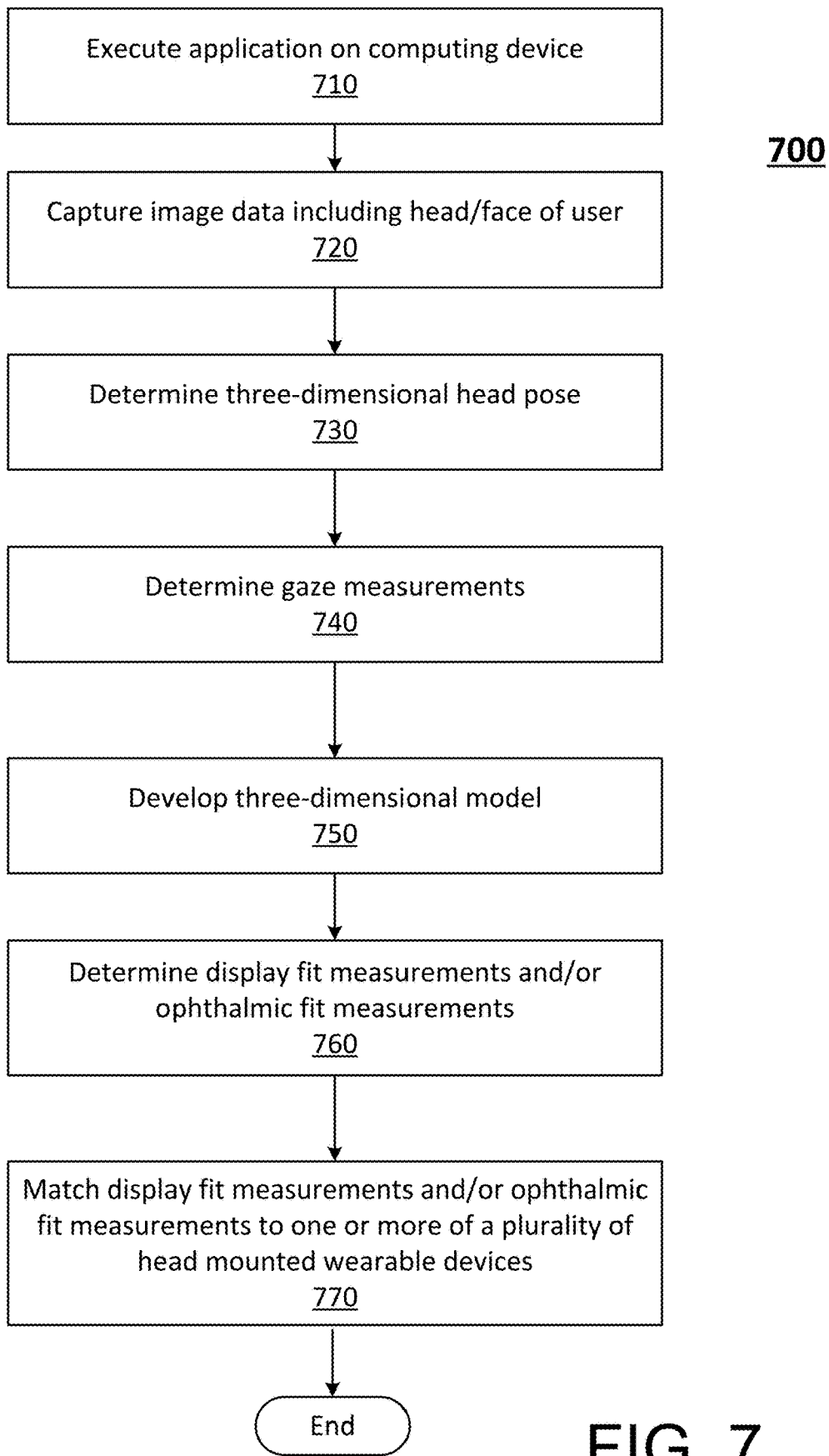
FIG. 7 is a flowchart of an example method, in accordance with implementations described herein.

FIG. 7 is a flowchart of an example method 700 of operating a computing system to detect display fit measurements and/or ophthalmic fit measurements for a head mounted wearable computing device including a display.

A user operating a computing device (such as, for example, the computing device 300 described above) may cause the computing device to execute an application that provides for detection of display fit measurements and/or ophthalmic fit measurements from image capture data (block 710). A camera (such as, for example, the camera 360 of the computing device 300 described above) is operated to capture image data including a face and/or a head of a user to be fitted for a head mounted wearable computing device (block 720).

The system may determine a three-dimensional pose of a head of the user based on the captured image data (block 730). In some examples, the computing device may determine the three-dimensional pose of the head locally, such as, for example, via the application executing on the computing device. IN some examples the computing device may transmit the captured image data to an external resource, such as an external server for determination of the three-dimensional head pose. The system may determine gaze measurements based on the captured image data (block 740). In some examples, the computing device may detect the gaze measurements from the captured image data locally, for example, within the application executing on the computing device. In some examples, the computing device may transmit the captured image data to an external resource, such as an external server for the detection of gaze measurements.

The system may develop a three-dimensional model based on the determined three-dimensional head pose and the determined gaze measurements (block 750), and may determine display fit measurements and/or ophthalmic fit measurements based on the three-dimensional model (block 760). The system may match one or more head mounted wearable devices, from a plurality of head mounted wearable devices, to user needs and preferences based on the display fit measurements and/or ophthalmic fit measurements (block 770). In the matching, the system may access a database of available head mounted wearable devices and configuration information associated with the plurality of available head mounted wearable devices. The system may compare the configuration information associated with the plurality of available head mounted wearable devices to the display fit measurements and/or the ophthalmic fit measurements detected in the captured image information. The system may use the results of the comparison to provide one or more head mounted wearable computing devices that meet the display fit and/or ophthalmic fit requirements.

Figure 8:
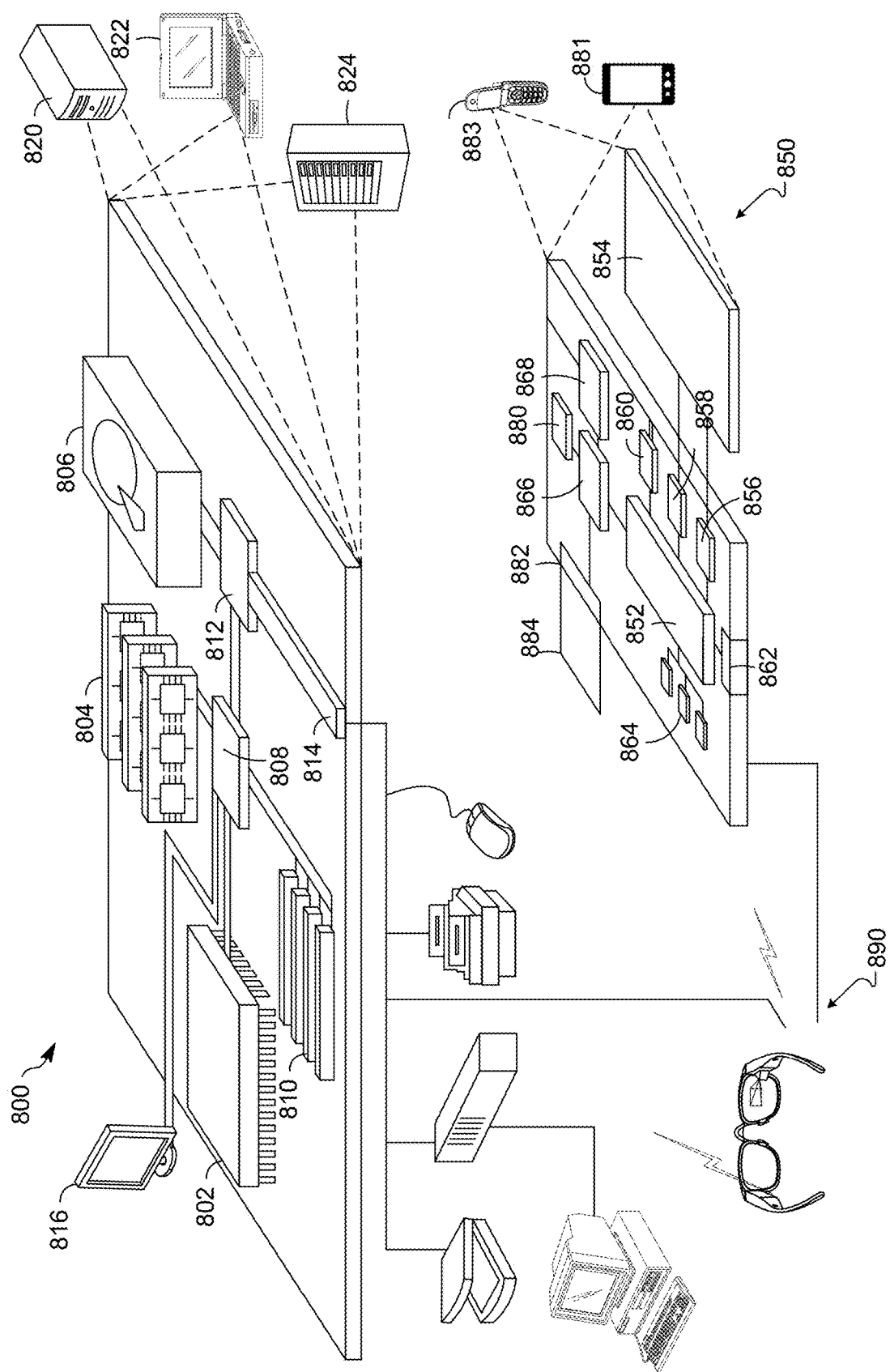
FIG. 8 illustrates example computing devices of the computing systems discussed herein.

FIG. 8 shows an example of a computing device 800 and a mobile computer device 850, which may be used with the techniques described here. Computing device 800 is intended to represent various forms of digital computers, such as laptops, desktops, tablets, workstations, personal digital assistants, smart devices, appliances, electronic sensor-based devices, televisions, servers, blade servers, mainframes, and other appropriate computing devices. Computing device 850 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 800 includes a processor 802, memory 804, a storage device 806, a high-speed interface 808 connecting to memory 804 and high-speed expansion ports 810, and a low speed interface 812 connecting to low speed bus 814 and storage device 806. The processor 802 can be a semiconductor-based processor. The memory 804 can be a semiconductor-based memory. Each of the components 802, 804, 806, 808, 810, and 812, are interconnected using various busses, and may be mounted on a common motherboard or in other manners as appropriate. The processor 802 can process instructions for execution within the computing device 800, including instructions stored in the memory 804 or on the storage device 806 to display graphical information for a GUI on an external input/output device, such as display 816 coupled to high speed interface 808. In other implementations, multiple processors and/or multiple buses may be used, as appropriate, along with multiple memories and types of memory. Also, multiple computing devices 800 may be connected, with each device providing portions of the necessary operations (e.g., as a server bank, a group of blade servers, or a multi-processor system).

The memory 804 stores information within the computing device 800. In one implementation, the memory 804 is a volatile memory unit or units. In another implementation, the memory 804 is a non-volatile memory unit or units. The memory 804 may also be another form of computer-readable medium, such as a magnetic or optical disk. In general, the computer-readable medium may be a non-transitory computer-readable medium.

The storage device 806 is capable of providing mass storage for the computing device 800. In one implementation, the storage device 806 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods and/or computer-implemented methods, such as those described above. The information carrier is a computer- or machine-readable medium, such as the memory 804, the storage device 806, or memory on processor 802.

The high speed controller 808 manages bandwidth-intensive operations for the computing device 800, while the low speed controller 812 manages lower bandwidth-intensive operations. Such allocation of functions is exemplary only. In one implementation, the high-speed controller 808 is coupled to memory 804, display 816 (e.g., through a graphics processor or accelerator), and to high-speed expansion ports 810, which may accept various expansion cards (not shown). In the implementation, low-speed controller 812 is coupled to storage device 806 and low-speed expansion port 814. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 800 may be implemented in a number of different forms, as shown in the figure. For example, it may be implemented as a standard server 820, or multiple times in a group of such servers. It may also be implemented as part of a rack server system 824. In addition, it may be implemented in a computer such as a laptop computer 822. Alternatively, components from computing device 800 may be combined with other components in a mobile device (not shown), such as device 850. Each of such devices may contain one or more of computing device 800, 850, and an entire system may be made up of multiple computing devices 800, 850 communicating with each other.

Computing device 850 includes a processor 852, memory 864, an input/output device such as a display 854, a communication interface 866, and a transceiver 868, among other components. The device 850 may also be provided with a storage device, such as a microdrive or other device, to provide additional storage. Each of the components 850, 852, 864, 854, 866, and 868, are interconnected using various buses, and several of the components may be mounted on a common motherboard or in other manners as appropriate.

The processor 852 can execute instructions within the computing device 850, including instructions stored in the memory 864. The processor may be implemented as a chipset of chips that include separate and multiple analog and digital processors. The processor may provide, for example, for coordination of the other components of the device 850, such as control of user interfaces, applications run by device 850, and wireless communication by device 850.

Processor 852 may communicate with a user through control interface 858 and display interface 856 coupled to a display 854. The display 854 may be, for example, a TFT LCD (Thin-Film-Transistor Liquid Crystal Display) or an OLED (Organic Light Emitting Diode) display, or other appropriate display technology. The display interface 856 may comprise appropriate circuitry for driving the display 854 to present graphical and other information to a user. The control interface 858 may receive commands from a user and convert them for submission to the processor 852. In addition, an external interface 862 may be provided in communication with processor 852, so as to enable near area communication of device 850 with other devices. External interface 862 may provide, for example, for wired communication in some implementations, or for wireless communication in other implementations, and multiple interfaces may also be used.

The memory 864 stores information within the computing device 850. The memory 864 can be implemented as one or more of a computer-readable medium or media, a volatile memory unit or units, or a non-volatile memory unit or units. Expansion memory 884 may also be provided and connected to device 850 through expansion interface 882, which may include, for example, a SIMM (Single In Line Memory Module) card interface. Such expansion memory 884 may provide extra storage space for device 850, or may also store applications or other information for device 850. Specifically, expansion memory 884 may include instructions to carry out or supplement the processes described above, and may include secure information also. Thus, for example, expansion memory 884 may be provided as a security module for device 850, and may be programmed with instructions that permit secure use of device 850. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 864, expansion memory 884, or memory on processor 852, that may be received, for example, over transceiver 868 or external interface 862.

Device 850 may communicate wirelessly through communication interface 866, which may include digital signal processing circuitry where necessary. Communication interface 866 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 868. In addition, short-range communication may occur, such as using a Bluetooth, low power Bluetooth, Wi-Fi, or other such transceiver (not shown). In addition, GPS (Global Positioning System) receiver module 880 may provide additional navigation- and location-related wireless data to device 850, which may be used as appropriate by applications running on device 850.

Device 850 may also communicate audibly using audio codec 860, which may receive spoken information from a user and convert it to usable digital information. Audio codec 860 may likewise generate audible sound for a user, such as through a speaker, e.g., in a handset of device 850. Such sound may include sound from voice telephone calls, may include recorded sound (e.g., voice messages, music files, etc.) and may also include sound generated by applications operating on device 850.

The computing device 850 may be implemented in a number of different forms, as shown in the figure. For example, it may be implemented as a cellular telephone 883. It may also be implemented as part of a smart phone 881, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as modules, programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor, or LED (light emitting diode)) for displaying information to the user and a keyboard and a pointing device (e.g., a mouse or a trackball) by which the user can provide input to the computer. Other kinds of devices can be used to provide for interaction with a user as well. For example, feedback provided to the user can be any form of sensory feedback (e.g., visual feedback, auditory feedback, or tactile feedback), and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In some embodiments, the computing devices depicted in FIG. 8 can include sensors that interface with an AR/VR headset (AR glasses/eyeglasses/VR headset/AR headset/HMD device 890). For example, one or more sensors included on computing device 850 or other computing device depicted in FIG. 8, can provide input to AR/VR headset 890 or in general, provide input to an AR/VR space. The sensors can include, but are not limited to, a touchscreen, accelerometers, gyroscopes, pressure sensors, biometric sensors, temperature sensors, humidity sensors, and ambient light sensors. Computing device 850 can use the sensors to determine an absolute position and/or a detected rotation of the computing device in the AR/VR space that can then be used as input to the AR/VR space. For example, computing device 850 may be incorporated into the AR/VR space as a virtual object, such as a controller, a laser pointer, a keyboard, a weapon, etc. Positioning of the computing device/virtual object by the user when incorporated into the AR/VR space can allow the user to position the computing device to view the virtual object in certain manners in the AR/VR space.

In some embodiments, one or more input devices included on, or connected to, the computing device 850 can be used as input to the AR/VR space. The input devices can include, but are not limited to, a touchscreen, a keyboard, one or more buttons, a trackpad, a touchpad, a pointing device, a mouse, a trackball, a joystick, a camera, a microphone, earphones or buds with input functionality, a gaming controller, or other connectable input device. A user interacting with an input device included on the computing device 850 when the computing device is incorporated into the AR/VR space can cause a particular action to occur in the AR/VR space.

In some embodiments, one or more output devices included on the computing device 850 can provide output and/or feedback to a user of the AR/VR headset 890 in the AR/VR space. The output and feedback can be visual, tactical, or audio. The output and/or feedback can include, but is not limited to, rendering the AR/VR space or the virtual environment, vibrations, turning on and off or blinking and/or flashing of one or more lights or strobes, sounding an alarm, playing a chime, playing a song, and playing of an audio file. The output devices can include, but are not limited to, vibration motors, vibration coils, piezoelectric devices, electrostatic devices, light emitting diodes (LEDs), strobes, and speakers.

In some embodiments, computing device 850 can be placed within AR/VR headset 890 to create an AR/VR system. AR/VR headset 890 can include one or more positioning elements that allow for the placement of computing device 850, such as smart phone 881, in the appropriate position within AR/VR headset 890. In such embodiments, the display of smart phone 881 can render stereoscopic images representing the AR/VR space or virtual environment.

In some embodiments, the computing device 850 may appear as another object in a computer-generated, 3D environment. Interactions by the user with the computing device 850 (e.g., rotating, shaking, touching a touchscreen, swiping a finger across a touch screen) can be interpreted as interactions with the object in the AR/VR space. As just one example, computing device can be a laser pointer. In such an example, computing device 850 appears as a virtual laser pointer in the computer-generated, 3D environment. As the user manipulates computing device 850, the user in the AR/VR space sees movement of the laser pointer. The user receives feedback from interactions with the computing device 850 in the AR/VR environment on the computing device 850 or on the AR/VR headset 890.

In some embodiments, a computing device 850 may include a touchscreen. For example, a user can interact with the touchscreen in a particular manner that can mimic what happens on the touchscreen with what happens in the AR/VR space. For example, a user may use a pinching-type motion to zoom content displayed on the touchscreen. This pinching-type motion on the touchscreen can cause information provided in the AR/VR space to be zoomed. In another example, the computing device may be rendered as a virtual book in a computer-generated, 3D environment. In the AR/VR space, the pages of the book can be displayed in the AR/VR space and the swiping of a finger of the user across the touchscreen can be interpreted as turning/flipping a page of the virtual book. As each page is turned/flipped, in addition to seeing the page contents change, the user may be provided with audio feedback, such as the sound of the turning of a page in a book.

In some embodiments, one or more input devices in addition to the computing device (e.g., a mouse, a keyboard) can be rendered in a computer-generated, 3D environment. The rendered input devices (e.g., the rendered mouse, the rendered keyboard) can be used as rendered in the AR/VR space to control objects in the AR/VR space.

A number of embodiments have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

Further to the descriptions above, a user is provided with controls allowing the user to make an election as to both if and when systems, programs, devices, networks, or features described herein may enable collection of user information (e.g., information about a user's social network, social actions, or activities, profession, a user's preferences, or a user's current location), and if the user is sent content or communications from a server. In addition, certain data may be treated in one or more ways before it is stored or used, so that user information is removed. For example, a user's identity may be treated so that no user information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

The computer system (e.g., computing device) may be configured to wirelessly communicate with a network server over a network via a communication link established with the network server using any known wireless communications technologies and protocols including radio frequency (RF), microwave frequency (MWF), and/or infrared frequency (IRF) wireless communications technologies and protocols adapted for communication over the network.

In accordance with aspects of the disclosure, implementations of various techniques described herein may be implemented in digital electronic circuitry, or in computer hardware, firmware, software, or in combinations of them. Implementations may be implemented as a computer program product (e.g., a computer program tangibly embodied in an information carrier, a machine-readable storage device, a computer-readable medium, a tangible computer-readable medium), for processing by, or to control the operation of, data processing apparatus (e.g., a programmable processor, a computer, or multiple computers). In some implementations, a tangible computer-readable storage medium may be configured to store instructions that when executed cause a processor to perform a process. A computer program, such as the computer program(s) described above, may be written in any form of programming language, including compiled or interpreted languages, and may be deployed in any form, including as a standalone program or as a module, component, subroutine, or other unit suitable for use in a computing environment. A computer program may be deployed to be processed on one computer or on multiple computers at one site or distributed across multiple sites and interconnected by a communication network.

Specific structural and functional details disclosed herein are merely representative for purposes of describing example embodiments. Example embodiments, however, may be embodied in many alternate forms and should not be construed as limited to only the embodiments set forth herein.

The terminology used herein is for the purpose of describing particular embodiments only and is not intended to be limiting of the embodiments. As used herein, the singular forms "a," "an," and "the" are intended to include the plural forms as well, unless the context clearly indicates otherwise. It will be further understood that the terms "comprises," "comprising," "includes," and/or "including," when used in this specification, specify the presence of the stated features, steps, operations, elements, and/or components, but do not preclude the presence or addition of one or more other features, steps, operations, elements, components, and/or groups thereof.

It will be understood that when an element is referred to as being "coupled," "connected," or "responsive" to, or "on," another element, it can be directly coupled, connected, or responsive to, or on, the other element, or intervening elements may also be present. In contrast, when an element is referred to as being "directly coupled," "directly connected," or "directly responsive" to, or "directly on," another element, there are no intervening elements present. As used herein the term "and/or" includes any and all combinations of one or more of the associated listed items.

Spatially relative terms, such as "beneath," "below," "lower," "above," "upper," and the like, may be used herein for ease of description to describe one element or feature in relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device may be otherwise oriented (rotated 70 degrees or at other orientations) and the spatially relative descriptors used herein may be interpreted accordingly.

Example embodiments of the concepts are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments of the described concepts should not be construed as limited to the particular shapes of regions illustrated herein but are to include deviations in shapes that result, for example, from manufacturing. Accordingly, the regions illustrated in the figures are schematic in nature and their shapes are not intended to illustrate the actual shape of a region of a device and are not intended to limit the scope of example embodiments.

It will be understood that although the terms "first," "second," etc. may be used herein to describe various elements, these elements should not be limited by these terms. These terms are only used to distinguish one element from another. Thus, a "first" element could be termed a "second" element without departing from the teachings of the present embodiments.

Unless otherwise defined, the terms (including technical and scientific terms) used herein have the same meaning as commonly understood by one of ordinary skill in the art to which these concepts belong. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

While certain features of the described implementations have been illustrated as described herein, many modifications, substitutions, changes, and equivalents will now occur to those skilled in the art. It is, therefore, to be understood that the appended claims are intended to cover such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components, and/or features of the different implementations described.

What is claimed is:

1. A computer-implemented method of detecting display fit measurements for a head mounted wearable computing device including a display device, the computer-implemented method comprising:
    capturing image data including images of a head of a user, via an application executing on a computing device operated by the user, including:
        capturing first image data for development of a three-dimensional model of the head of the user;
        capturing second image data; and
        detecting a plurality of optical measurements in the second image data;
    developing, via the application, the three-dimensional model of the head of the user based on the image data;
    transmitting, by the computing device, the three-dimensional model of the head of the user to a simulation engine;
    receiving, from the simulation engine, a three-dimensional pose of a head mounted wearable device on the head of the user in response to the transmitting of the three-dimensional model of the head of the user; and
    determining a configuration of the head mounted wearable device for the user based on the three-dimensional model of the head of the user and the three-dimensional pose of the head mounted wearable device on the head of the user.

2. The computer-implemented method of claim 1, wherein developing the three-dimensional model of the head of the user includes developing the three-dimensional model of the head of the user by a processor of the computing device.

3. The computer-implemented method of claim 1, wherein developing the three-dimensional model of the head of the user includes:
    transmitting, by the computing device, the image data to an external computing device; and
    receiving, by the computing device, the three-dimensional model of the head of the user from the external computing device.

4. The computer-implemented method of claim 1, wherein capturing the image data includes:
    triggering output of a first prompt to the user for user capture of the first image data; and
    capturing the first image data in response to the first prompt.

5. The computer-implemented method of claim 4, wherein triggering output of the first prompt includes outputting guidance to the user related to user adjustment of at least one of a position of the computing device, an orientation of the computing device, or a head posture.

6. The computer-implemented method of claim 5, wherein triggering output of the first prompt includes outputting a progress indicator indicating progress and completion in the user capture of the first set of image data.

7. The computer-implemented method of claim 4, wherein capturing the image data includes:
    triggering output of a second prompt to the user for user capture of the second image data; and
    capturing the second image data in response to the second prompt.

8. The computer-implemented method of claim 7, wherein triggering output of the second prompt includes outputting guidance directing an eye gaze of the user relative to the computing device.

9. The computer-implemented method of claim 8, wherein outputting the guidance directing the eye gaze of the user relative to the computing device includes at least one of:
    directing the user to gaze at a camera of the computing device; or
    triggering display of a focus object on a display device of the computing device; and
    directing the user to gaze at the focus object.

10. The computer-implemented method of claim 8, wherein triggering output of the second prompt includes outputting a progress indicator indicating progress and completion in capturing the second image data.

11. The computer-implemented method of claim 7, wherein triggering output of the first prompt includes outputting at least one of a visual prompt or an audible prompt, and triggering output of the second prompt includes outputting at least one of a visual prompt or an audible prompt.

12. The computer-implemented method of claim 7, wherein the plurality of optical measurements include at least one of pupil height, interpupillary distance, left pupil distance, right pupil distance, vertex distance or pantoscopic angle.

13. The computer-implemented method of claim 7, further comprising:
   determining an ophthalmic fit for the head mounted wearable device based on the plurality of optical measurements for incorporation of corrective lenses into the head mounted wearable device; and
   adapting the configuration of the head mounted wearable device to accommodate the ophthalmic fit.

14. The computer-implemented method of claim 1, wherein the application executing on the computing device invokes a self-portrait mode of operation and initiates operation of a forward facing camera of the computing device operated by the user.

15. A non-transitory computer-readable medium storing executable instructions that when executed by at least one processor are configured to cause the at least one processor to:
   capture image data including images of a head of a user, via an application executing on a computing device operated by the user, including:
      capture first image data for development of a three-dimensional model of the head of the user; and
      capture second image data for detection of a plurality of optical measurements related to a three-dimensional pose of a head mounted wearable computing device;
   develop, via the application executing on the computing device, the three-dimensional model of the head of the user based on the image data;
   transmit, by the computing device, the three-dimensional model of the head of the user to a simulation engine;
   receive, from the simulation engine, the three-dimensional pose of the head mounted wearable computing device including a display device, as the head mounted wearable computing device would be worn by the user; and
   determine a configuration of the head mounted wearable computing device including the display device based on the three-dimensional model of the head of the user and the three-dimensional pose of the head mounted wearable computing device on the head of the user.

16. The non-transitory computer-readable medium of claim 15, wherein the executable instructions cause the at least one processor to:
   trigger output of a first prompt to the user for user capture of the first image data;
   process the first image data for the development of the three-dimensional model of the head of the user;
   trigger output of a second prompt to the user for user capture of the second image data; and
   process the second image data for the detection of the plurality of optical measurements related to the three-dimensional pose of the head mounted wearable computing device as the head mounted wearable computing device would be worn on the head of the user.

17. The non-transitory computer-readable medium of claim 16, wherein the executable instructions cause the at least one processor to:
   trigger the output of the first prompt including at least one of a visual prompt or an audible prompt; and
   trigger the output of the second prompt including at least one of a visual prompt or an audible prompt.

18. The non-transitory computer-readable medium of claim 16, wherein the executable instructions cause the at least one processor to:
   trigger the output of the first prompt including guidance to the user related to user adjustment of at least one of a position of the computing device, an orientation of the computing device, or a head posture; and
   trigger the output of the second prompt including guidance directing an eye gaze of the user relative to the computing device.

19. The non-transitory computer-readable medium of claim 18, wherein the executable instructions cause the at least one processor to output the guidance directing the eye gaze of the user relative to the computing device, including at least one of:
   directing the user to gaze at a camera of the computing device; or
   triggering display of a focus object on a display device of the computing device; and
   directing the user to gaze at the focus object.

20. The non-transitory computer-readable medium of claim 15, wherein the executable instructions cause the at least one processor to:
   determine an ophthalmic fit for the head mounted wearable computing device based on a plurality of optical measurements for incorporation of corrective lenses into the head mounted wearable computing device; and
   adapt the configuration of the head mounted wearable computing device to accommodate the ophthalmic fit.

21. A method, comprising:
   receiving, by a server computing device from an application executing on a user computing device, a three-dimensional model of a head of a user, the three-dimensional model being based on image data of the head of the user captured by the user computing device;
   analyzing, by a simulation engine, the three-dimensional model received from the user computing device;
   detecting, by the simulation engine, a plurality of physical features and a plurality of optical measurements within the three-dimensional model received from the user computing device based on the analyzing; and
   configuring, by the simulation engine, a head mounted wearable computing device for a user of the user computing device based on the three-dimensional model of the head of the user, including:
      determining display fit measurements based on the three-dimensional model of the head of the user; and
      matching at least one of the display fit measurements or the plurality of optical measurements with at least one of a plurality of previously stored head mounted wearable computing devices accessible in a database of the server computing device.

22. The method of claim 21, wherein configuring the head mounted wearable computing device for the user of the user computing device includes:
   accessing, from the database of the server computing device, previously stored configuration information associated with the plurality of previously stored head mounted wearable computing devices; and
   matching the display fit measurements and the plurality of optical measurements with at least one of the plurality of previously stored head mounted wearable computing devices based on the previously stored configuration information associated with the plurality of previously stored head mounted wearable computing devices.

23. The method of claim 22, wherein configuring the head mounted wearable computing device for the user of the user computing device also includes:
   determining an ophthalmic fit for the head mounted wearable computing device based on the three-dimensional model of the head of the user and the plurality of optical measurements for incorporation of corrective lenses into the head mounted wearable computing device; and adapting a configuration of the head mounted wearable computing device based on the configuring to accommodate the ophthalmic fit.

\* \* \* \* \*